(12) United States Patent
Thurau et al.

(10) Patent No.: US 11,825,014 B1
(45) Date of Patent: Nov. 21, 2023

(54) LOCATION-SPECIFIC RESOURCE ALERT GENERATION

(71) Applicant: Strategies for Youth, Inc., Cambridge, MA (US)

(72) Inventors: Lisa Hilde Thurau, Cambridge, MA (US); Jack Conrad Gray, Cambridge, MA (US); William David Walker, South Berwick, ME (US)

(73) Assignee: Strategies for Youth, Inc., Cambridge, MA (US)

( * ) Notice: Subject to any disclaimer, the term of this patent is extended or adjusted under 35 U.S.C. 154(b) by 0 days.

(21) Appl. No.: 17/710,834

(22) Filed: Mar. 31, 2022

Related U.S. Application Data

(60) Provisional application No. 63/168,333, filed on Mar. 31, 2021.

(51) Int. Cl.
*G06F 3/048* (2013.01)
*H04M 1/72457* (2021.01)
*G06F 3/0482* (2013.01)

(52) U.S. Cl.
CPC ...... *H04M 1/72457* (2021.01); *G06F 3/0482* (2013.01)

(58) Field of Classification Search
CPC .............................. G06F 3/0482; G06Q 50/22
See application file for complete search history.

(56) References Cited

U.S. PATENT DOCUMENTS

| | | | |
|---|---|---|---|
| 9,384,491 B1 * | 7/2016 | Briggs | H04W 4/44 |
| 10,171,390 B2 | 1/2019 | Crawford | |
| 2006/0140200 A1 * | 6/2006 | Black | H04L 65/1043 370/401 |
| 2011/0265072 A1 * | 10/2011 | Matthew | G06F 8/65 717/169 |
| 2012/0226542 A1 * | 9/2012 | Blosser | G06Q 30/02 705/14.1 |
| 2013/0073394 A1 * | 3/2013 | Scalisi | G06Q 20/40 705/14.64 |
| 2017/0278210 A1 * | 9/2017 | Chen | G16H 40/67 |

(Continued)

OTHER PUBLICATIONS

Application: FindHelp.app; Findhelp Facebook Post; Nov. 20, 2020 (1 page).

(Continued)

*Primary Examiner* — Claudia Dragoescu
(74) *Attorney, Agent, or Firm* — COOLEY LLP

(57) ABSTRACT

A processor-implemented method includes receiving, at a first mobile compute device of a user, a service request. Curated service information associated with the service request is retrieved in response to the user input, and displayed via a graphical user interface (GUI) of the first mobile compute device. A user selection of a subset of the curated service information is received via the GUI, and a phone number is received in response to the user populating a phone number field of the GUI. A send icon is displayed via the GUI in response to receiving at least one of the selection or the phone number. In response to a user selecting the send icon, a communication with the subset of service information is sent to a second mobile compute device having the phone number and associated with a service recipient, without including any self-identifying information associated with the user.

20 Claims, 29 Drawing Sheets

(56) References Cited

U.S. PATENT DOCUMENTS

2018/0131655 A1* 5/2018 Carbune ................ G06Q 50/01
2022/0300914 A1* 9/2022 Dingle ................... G06Q 50/30

OTHER PUBLICATIONS

Website: https://helpmegrowks.org; Help Me Grow® Kansas An Affiliate of the National Network 1-800-CHILDREN Nov. 1, 2020 (3 pages).

* cited by examiner

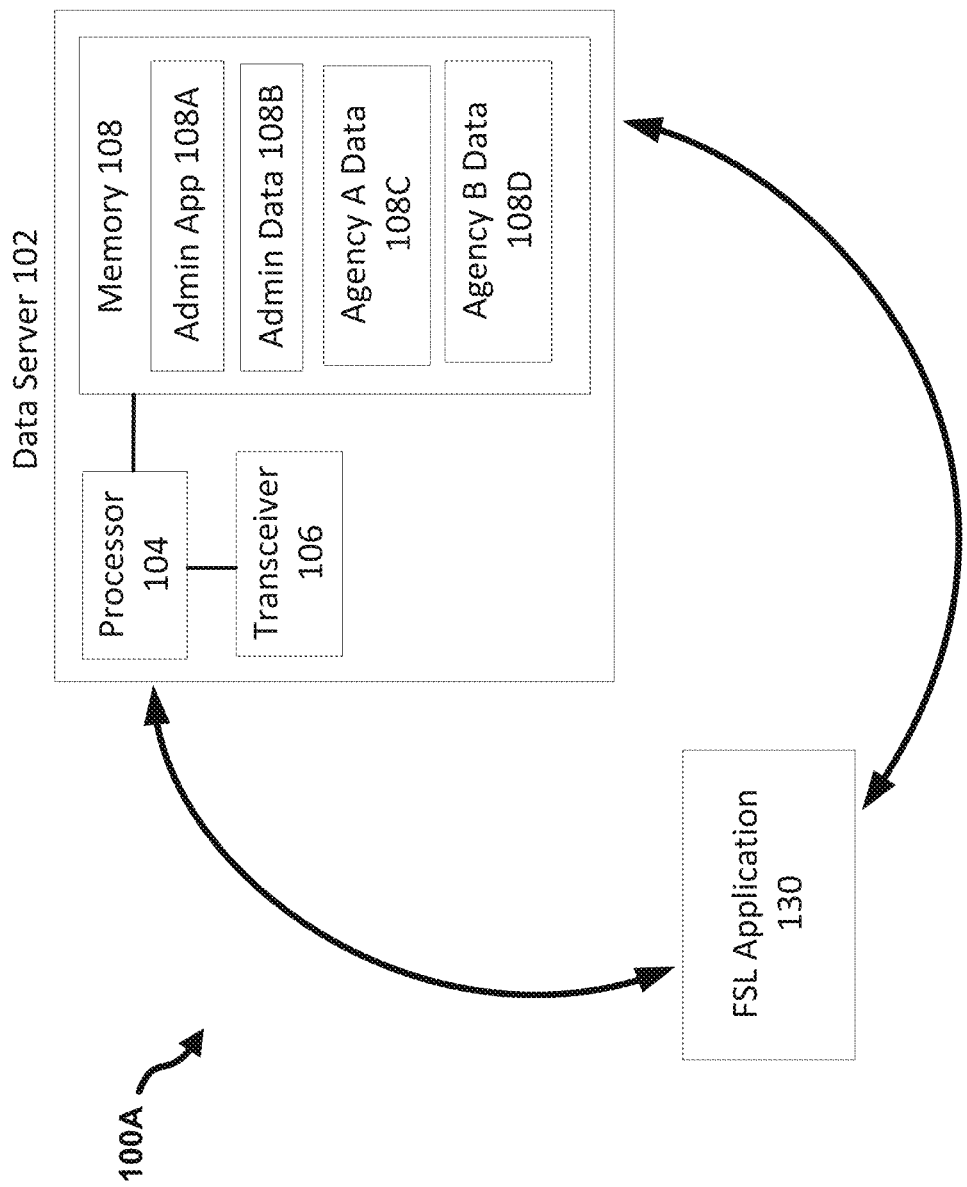

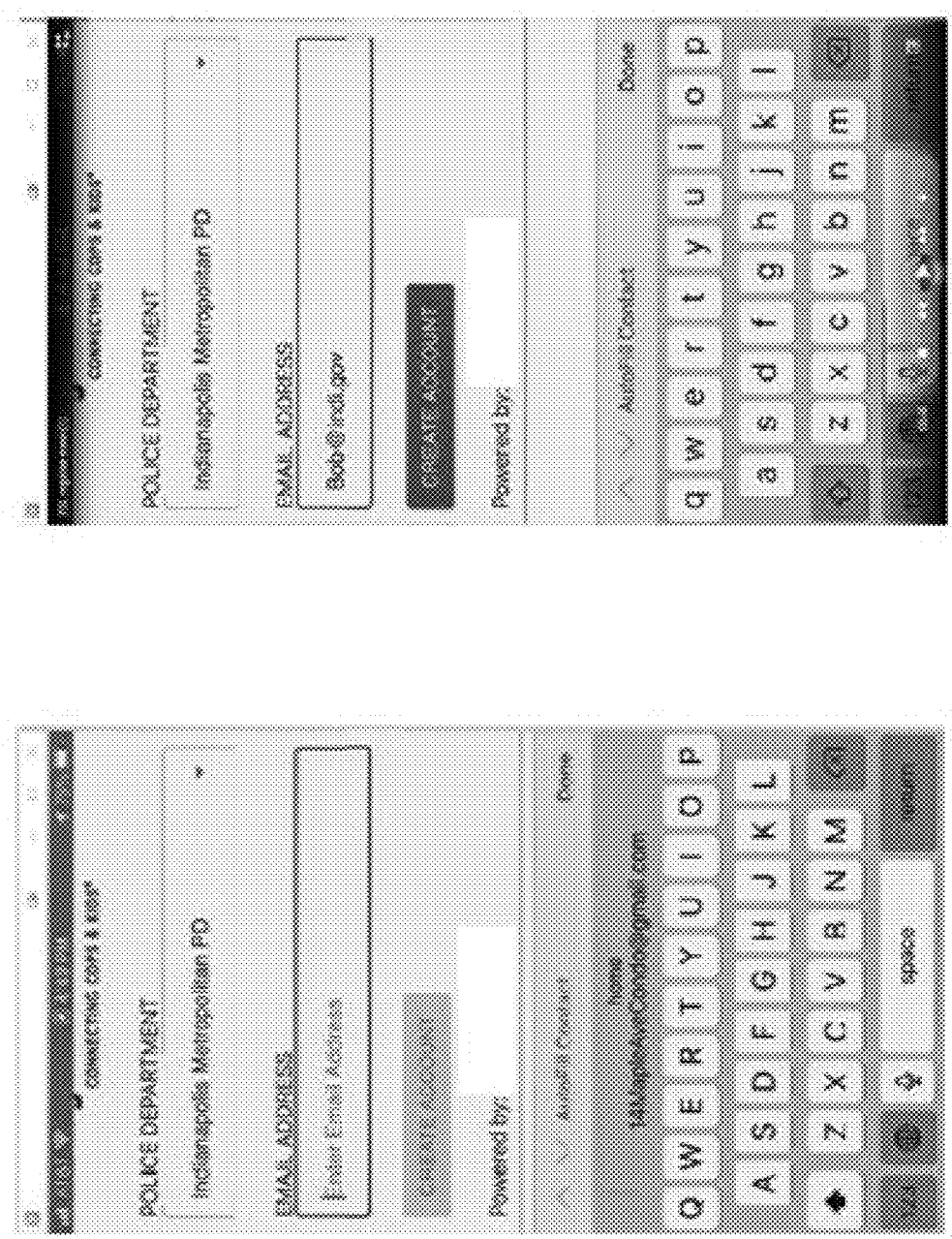

LOCATION-SPECIFIC RESOURCE ALERT GENERATION

CROSS-REFERENCE TO RELATED APPLICATIONS

This application claims priority to and the benefit of U.S. Provisional Patent Application No. 63/168,333, filed Mar. 31, 2021 and titled "Location-Specific Resource Alert Generation," the disclosure of which is hereby incorporated by reference in its entirety.

FIELD

The present disclosure relates to the curation of resource data and the selective distribution of the curated resource data via a mobile software application while obscuring an identity of the sender.

BACKGROUND

Law enforcement agencies in the U.S. rarely form structured partnerships with youth-serving community-based organizations. Law enforcement officers frequently make decisions that result in either the arrest of a youth or the admission of the youth to a hospital, for example in hopes that the youth can obtain services via the juvenile justice system or the hospital. Such services, however, often do not exist within the juvenile justice system (and, in any event, come with the "price tag" of an arrest and court record), and hospitals routinely do not have many desired services (e.g., social services, housing, etc.).

SUMMARY

In some embodiments, a method includes receiving, at a processor of a first mobile compute device, a user input including a representation of a service request. Each of the user input and the first mobile compute device is associated with a user. The method also includes retrieving, via the processor and in response to receiving the user input, curated service information associated with the service request, and causing display, via a graphical user interface (GUI) of the first mobile compute device, of the curated service information. The method also includes receiving, at the processor and in response to an interaction of the user via the GUI, a selection of a subset of service information from the curated service information, and receiving, at the processor and in response to the user populating a phone number field of the GUI, a phone number. The method also includes causing display, via the GUI, of a send icon in response to at least one of the receiving the selection of the subset of service information or the receiving the phone number. The method also includes causing transmission of a communication (e.g., an electronic communication) to a second mobile compute device having the phone number and associated with a service recipient, the communication including a representation of the subset of service information and does not include any self-identifying information associated with the user. Instead of or in addition to a phone number, an email address and/or a voice over Internet Protocol (VoIP) address/destination can be used as part of the foregoing process.

In some embodiments, a method includes receiving, from a first mobile compute device, a signal representing a service request. The first mobile compute device is associated with a user. The method further includes retrieving, in response to receiving the service request and via a website, service information for a plurality of providers associated with the service request, the retrieving performed without accessing an app store. The method further includes causing display, via a graphical user interface (GUI) of the first mobile compute device, of user-navigable representations of the service information. The method also includes receiving, from the first mobile compute device, a signal representing (1) a selection of a provider from the plurality of providers, and (2) an indication of a command to send a text message containing the service information associated with the selected provider to a service recipient. The method also includes causing generation of the text message in response to receiving the selection of the provider and the command to send the text message, and at least one of: (a) causing transmission of the text message to a second mobile compute device associated with the service recipient without transmitting self-identifying information associated with the user, or (b) in response to detecting a lack of connectivity to the communications network, causing storage, in a memory of the first mobile compute device, of the text message for subsequent transmission.

BRIEF DESCRIPTIONS OF THE DRAWINGS

FIG. 1A is a diagram showing components of a first communication system for communicating information about services to a mobile compute device of a recipient, according to some embodiments.

Figure 7B:
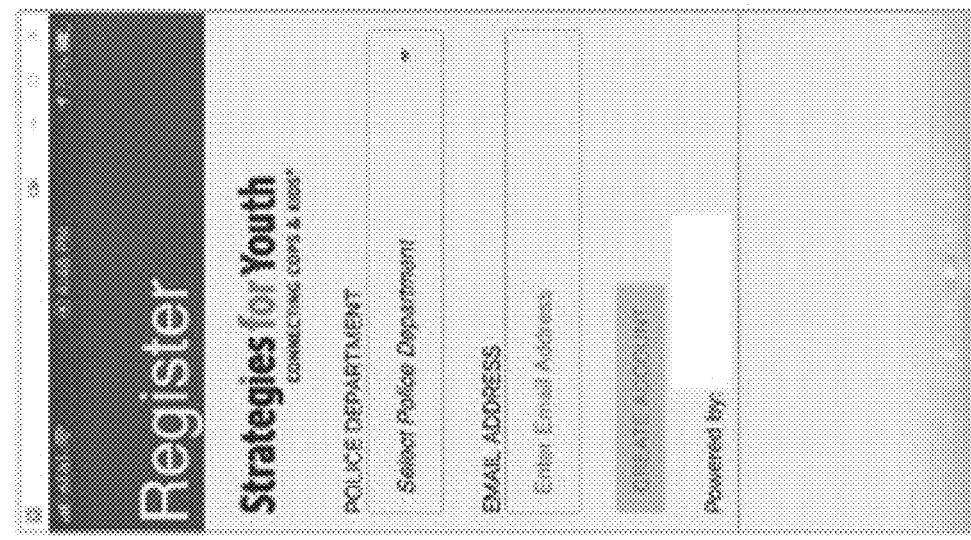
Figure 7A:
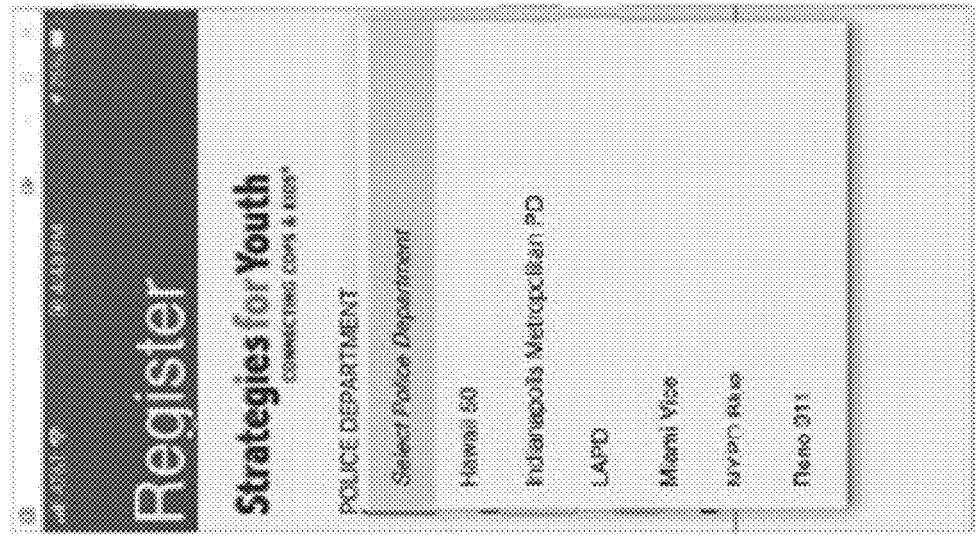

FIGS. 7A-7AF are example graphical user interface (GUI) screens of the mobile app, illustrating functionality thereof, according to some embodiments.

Figure 8:
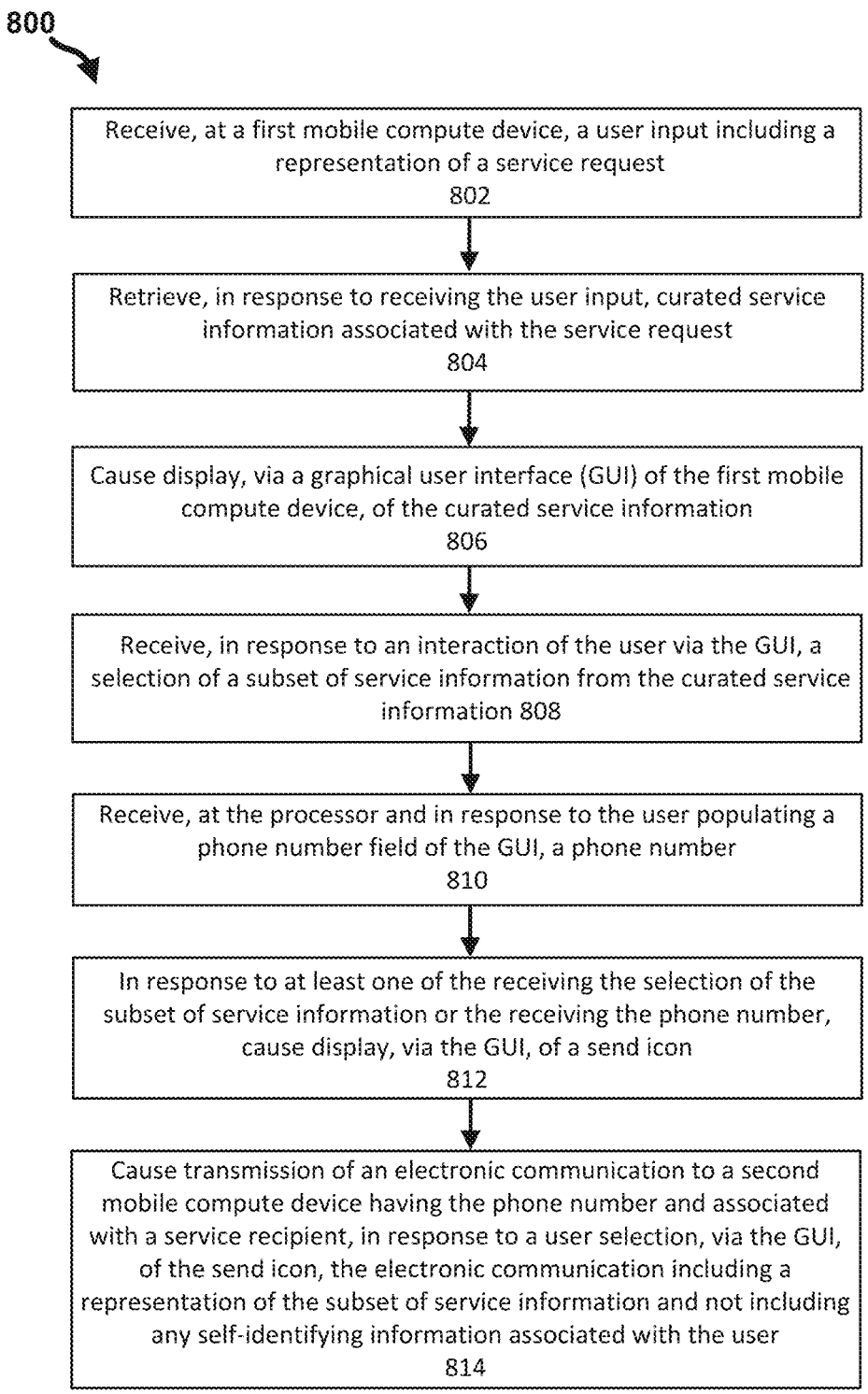

FIG. 8 is a flow diagram showing a first example operation of a mobile app, in accordance with some embodiments.

Figure 9:
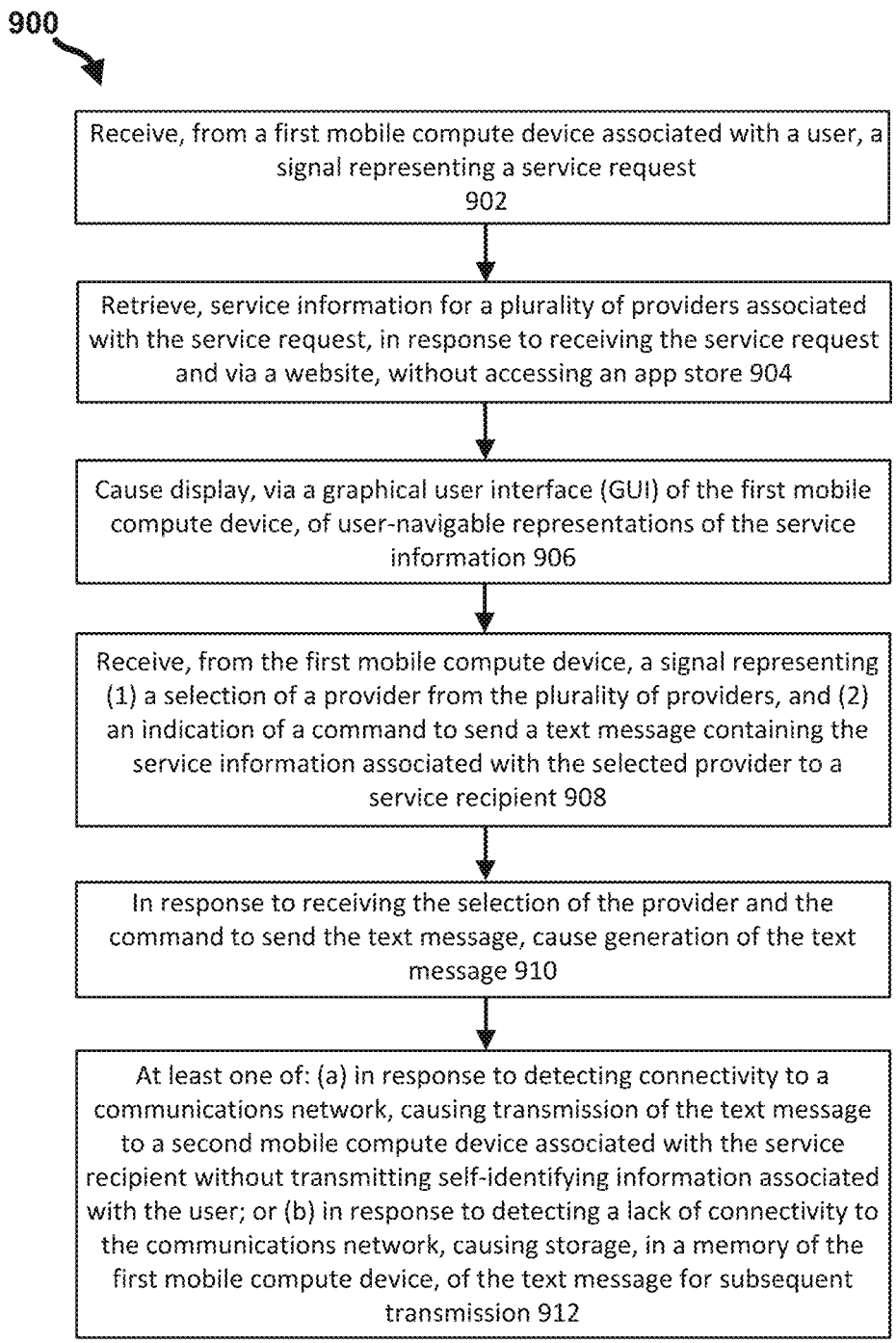

FIG. 9 is a flow diagram showing a second example operation of a mobile app, in accordance with some embodiments.

DETAILED DESCRIPTION

Law enforcement officers are increasingly acting/serving as first social responders. They are called to respond to a wide variety of matters, beyond those specifically requiring law enforcement responses. The need to divert requests for help to proper sources of assistance and to avoid entangling law enforcement resources needlessly is a daily challenge for most law enforcement agencies. Typically, when law enforcement agency (LEA) trainings are performed, printed handouts are often provided. Such printed handouts, however, quickly become out-of-date, can be easily misplaced, and can require considerable effort to research and produce. Moreover, some law enforcement officers do not wish to use printed handouts.

One or more embodiments of the present disclosure include a software application ("app"), called a "Fast Services Link" (FSL) application, that provides FSL users, such as law enforcement officers, with access to information about services targeted for service recipients (STSRs) (e.g., youth-serving community-based organization services) and the ability to share that information with service recipients and their families that the users encounter for example, in the course of their duties). The FSL application (FSL app) can be implemented as a web app and/or a mobile app, and can automatically generate/populate a curated list of STSRs based on each user's perceived and/or specified needs (e.g., as indicated via the FSL app). FSL users can, in turn, access such curated lists via the FSL app. The FSL user will also be able to share information about the services by texting (or otherwise electronically communicating) the information to the service recipients, without sending any self-identifying information (for example, without providing the phone number or other contact/identifying information of the sender). The text communications (or other electronic communications) generated via the FSL app can be referred to as resource alerts.

In some embodiments, the FSL app includes one of more of the following features:
Accurate up-to-date (e.g., real time) program information;
A streamlined, succinct format distilled from one or more original sources of information;
Quickly available (e.g., loads within a short period of time after launching the app);
Location and distance information for each service targeted for service recipients; and
The ability to share information about services with service recipients via texting from users' mobile devices while maintaining the users' privacy.

The FSL app, whether implemented as a web app, a mobile app, or both, uses data from one or more databases or data sources of services, such as community-based service providing organizations (CBOs). The retrieval of such data from the one or more databases or data sources can be performed, for example, via an API to obtain the desired services information. The retrieved services information can be distilled into a format that is customized for use by FSL users, e.g., in a different curated list of STSRs for each service recipient support organization (SRSO) (such as a law enforcement agency) that has registered with the FSL app. The STSRs may be selected, at least in part, based on an assessment of each FSL user agencies' experience with the needs of the service recipients they encounter.

In some embodiments, the FSL app includes a suite of software components that provide FSL users, who are interacting with service recipients, quick mobile access to information on local STSRs that can provide services to a service recipient that may benefit from such a service. Such resources can serve as alternatives to the service recipient's involvement, for example, in the juvenile justice system. These software components can include one or more of: (1) a web hosted mobile app service that provides the mobile app to mobile devices of authorized users; (2) a web hosted administration app service that provides the administration app to authorized users who, in turn, can authorize users such as SRSO administrators, FSL user agencies, end users, and testers of the mobile app; and (3) a web hosted data service that stores authorizations from the administration app, and provides up-to-date run time data to the mobile app.

In some embodiments, the FSL app is configured to track, e.g., for each SRSO, a number of queries and/or a frequency with which FSL users submit queries for services as well as make referrals. Some third-party data sources provide mechanisms for tracking referrals, which the FSL app may also use, either alone or in combination with the FSL app's own tracking.

In some embodiments, the FSL app includes one or more of the following features or functionalities:
Resources can be received from one or more third-party data sources that routinely vet and update all program information, thereby offering a built-in system of quality assurance about the programs being offered;
Selected subsets of retrieved data/information about the services are distilled (e.g., filtered, reorganized, reformatted, etc.), to provide the data/information in a streamlined format suitable for use by FSL users when under pressure;
Automated generation/population of a custom curated list of services for each SRSO (e.g., a different custom curated list for each SRSO, due to differences in service recipient population attributes, geographic considerations, location information, proximity to resources, etc.);
FSL users can select from among the listed STSRs, based on one or more factors such as proximity to the service recipient;
FSL users can obtain and share information about social services offered, location, distance, directions to the social services, and public transportation;
FSL users can text information to service recipients without sharing their personal information or contact information (e.g., via an anonymous phone number); and
Automatic tracking of information on the number of referrals made by each SRSO, and the STSRs to which referrals are made.

According to some embodiments, the FSL app can operate as follows, from the user interface perspective: consider a law enforcement officer who has encountered a girl who is suspected of shoplifting at a CVS pharmacy. The CVS store manager informs the law enforcement officer that he's seen the girl before and believes that she is homeless. The law enforcement officer suspects that this girl may participate in "survival crimes" (e.g., stealing to eat, to take care of basic needs, etc.). The law enforcement officer takes the girl out of the store and speaks to her. He learns that she is a runaway and does not want to go home. He also suspects that she may be trafficked. He offers to take her to a shelter, but she refuses to get in the car with him. He proposes to text her the name and location of the shelter and find the closest public transit to get her there. He texts her the information. She reviews the information, agrees to go, and then agrees to be driven there. She tells him she is going to put the address of the shelter into her smartphone's maps app to make sure he is taking her there and not to juvenile hall.

FIG. 1A is a diagram showing components of a first communication system 100A for communicating information about services to a mobile compute device of a recipient, according to some embodiments. As shown in FIG. 1A, a data server 102 includes a processor 104 operably connected to a transceiver 106 and a memory 108, the memory 108 storing an administrative software application ("administrative app") 108A, administrative data 108B (e.g., settings, permissions, templates, preferences, etc.), and/or data associated with one or more agencies (e.g., agency A data 108C and agency B data 108D). The data server 102 is communicatively coupled to one or more FSL software applications 130 (e.g., running on one or more mobile compute devices such as smartphones, laptop computers, tablets, etc.), and can exchange communications with the FSL application(s) 130 via the transceiver 106 and using wireless communication via one or more telecommunications networks. The FSL software application(s) 130 can be used by a user ("FSL user").

The administrative app 108A can be configured to access (e.g., on a permissioned basis) the administrative data 108A (which may include, for example, administrator data, agency data, user data, tester entitlements, categorized service data, agency-specific rules for acquiring data from third party data servers, etc.). In some implementations, there is no direct interaction between the FSL software application(s) 130 and the administrative app 108A; rather, the FSL software application(s) 130 retrieves data from the data server, some of which may have been explicitly placed on the data server by the administrative app 108A, or may have been automatically curated based on administrative data extraction rule specifications for a given agency. Data for multiple agencies may be stored in data server 102 and the FSL software application(s) 130 can retrieve data specific to or applicable to an agency of the FSL user (e.g., a LEA) from the data server 102. The administrative app 108A provides a way of storing data specific to an agency on the single data server 102, such that the single data server 102 can service multiple agencies.

Figure 1B:
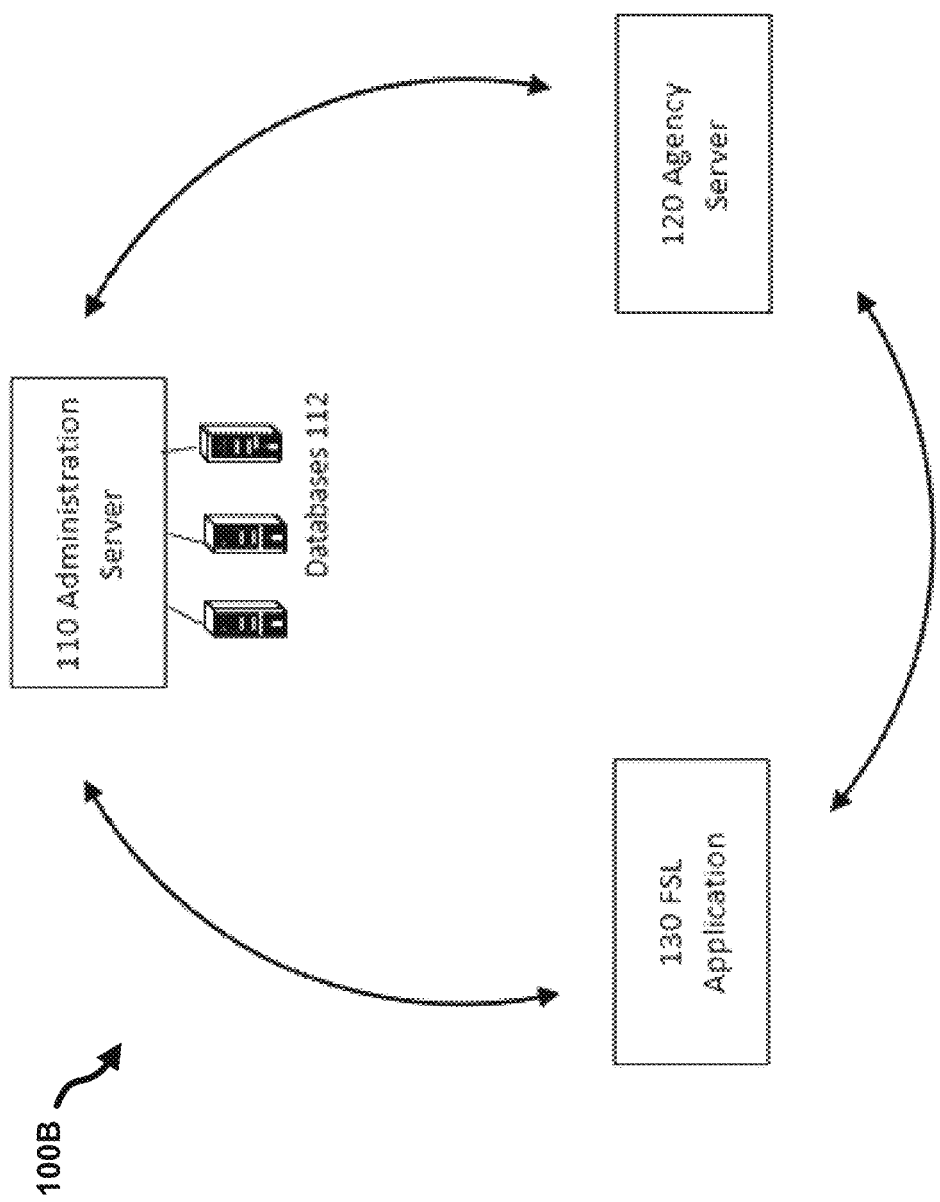
FIG. 1B is a diagram showing components of a second communication system for communicating information about services to a mobile compute device of a recipient, according to some embodiments.

FIG. 1B shows an example second communication system 100B including an administration server 110, an agency server 120, and a FSL application 130 (implemented/stored/executed on a compute device such as a smartphone) interacting with each other, e.g., via one or more communications networks (not shown in FIG. 1), according to an embodiment. In this embodiment, the "agency server 120" can refer to a server associated with an agency such as a law enforcement agency or other entity-based/institutional user of the FSL application 130. In one example, the administration server 110 is configured to provide data to FSL application 130 based on information obtained from agency server 120. Alternatively or in addition, agency server 120 and administration server 110 are configured to interact to determine what type of data may be provided to FSL application 130 (e.g., based on one or more settings, permissions, whitelists, data confidences, etc., which may be set by the agency server 120 and/or the administration server 110). For example, if the agency associated with agency server 120 is a law enforcement agency, agency server 120 may be configured to request, from administration server 110, services associated with law enforcement functions to the FSL application 130 (optionally limited thereto). In other words, a predefined set of services categories for a given agency or agency type may be defined by the agency and accessible via the agency server 120, and/or defined by an administrator and accessible via the administration server 110. In the law enforcement example, such services may include, by way of non-limiting example, one or more of: drug rehabilitation centers, shelters, medical services, food pantries, mental health services, support groups, and/or the like. In various embodiments, the administration server 110 is configured to receive a profile associated with the agency server 120, and based on the received profile, determine services that may be provided to the FSL application 130. For example, the profile may include a list of groups or categories of services that the FSL application 130 is to provide for its users ("FSL users"), where the users are associated with the agency hosting agency server 120.

In some implementations, the profile associated with agency server 120 is communicated to administration server 110 when the agency server 120 is undergoing a registration process with the administration server 110. As further shown in FIG. 1B (e.g., via the arrows shown in FIG. 1B), administration server 110 is configured to interact not only with the agency server 120 but also with the FSL application 130. In particular, the administration server 110 is configured to provide information about various services (herein, such information is referred to as service information or curated service information) to the FSL application 130, and this information may include names of the services, locations of the services, status of the services (e.g., whether or not service is open or closed), cost of the services, rating of the services, qualifications/eligibility parameters for the services, and/or the like. The administration server 110 can also be configured to update curated service information related to various services, and, in some cases, collect user statistics (e.g., a location at which the FSL user uses FSL application 130, the type(s) of services requested by the FSL user, the frequency at which user(s) communicate the service information to third parties, etc.), to further tailor or refine the service information. Further details about collecting/tracking FSL user statistics is provided below.

In various implementations, administration server 110 is configured to interact with one or more databases 112 to retrieve and/or update the service information, and to inquire about new services. In some implementations, service information updates may be performed/pushed to FSL application 130 when a determination is made that such information is to be updated (e.g., in response to detecting erroneous/outdated information and/or according to a predefined schedule). Alternatively or in addition, service information updates may be performed/pushed in response to a request made by an FSL user and received via the FSL application 130. Alternatively or in addition, service information updates may be performed/pushed in response to a request received at the administration server 110 from the agency server 120.

Further, the FSL application 130 may be configured to interact with agency server 120 via FSL application 130. For example, the FSL application 130 may be configured to transmit user statistics (e.g., number of encounters with recipients, type of encounters, regions in which the FSL user has used the FSL application 130, the type(s) of services requested by the FSL user, the frequency at which user(s) communicate the service information to third parties, and/or the like) to the agency server 120, as such information may be maintained by the agency and may or may not be shared with the administration server 110.

It should be appreciated that in some cases, agency server 120 may not be present, or alternatively may be part of FSL application 130. For example, an FSL user may be configured to register FSL application 130 directly with the administration server 110 by providing information about an agency of the FSL user (e.g., the type of information that may be provided by agency server 120 when agency server 120 is present). For example, the FSL user may provide a profile describing services that are requested by the FSL user based on the FSL user's affiliation with a particular agency.

Figure 2:
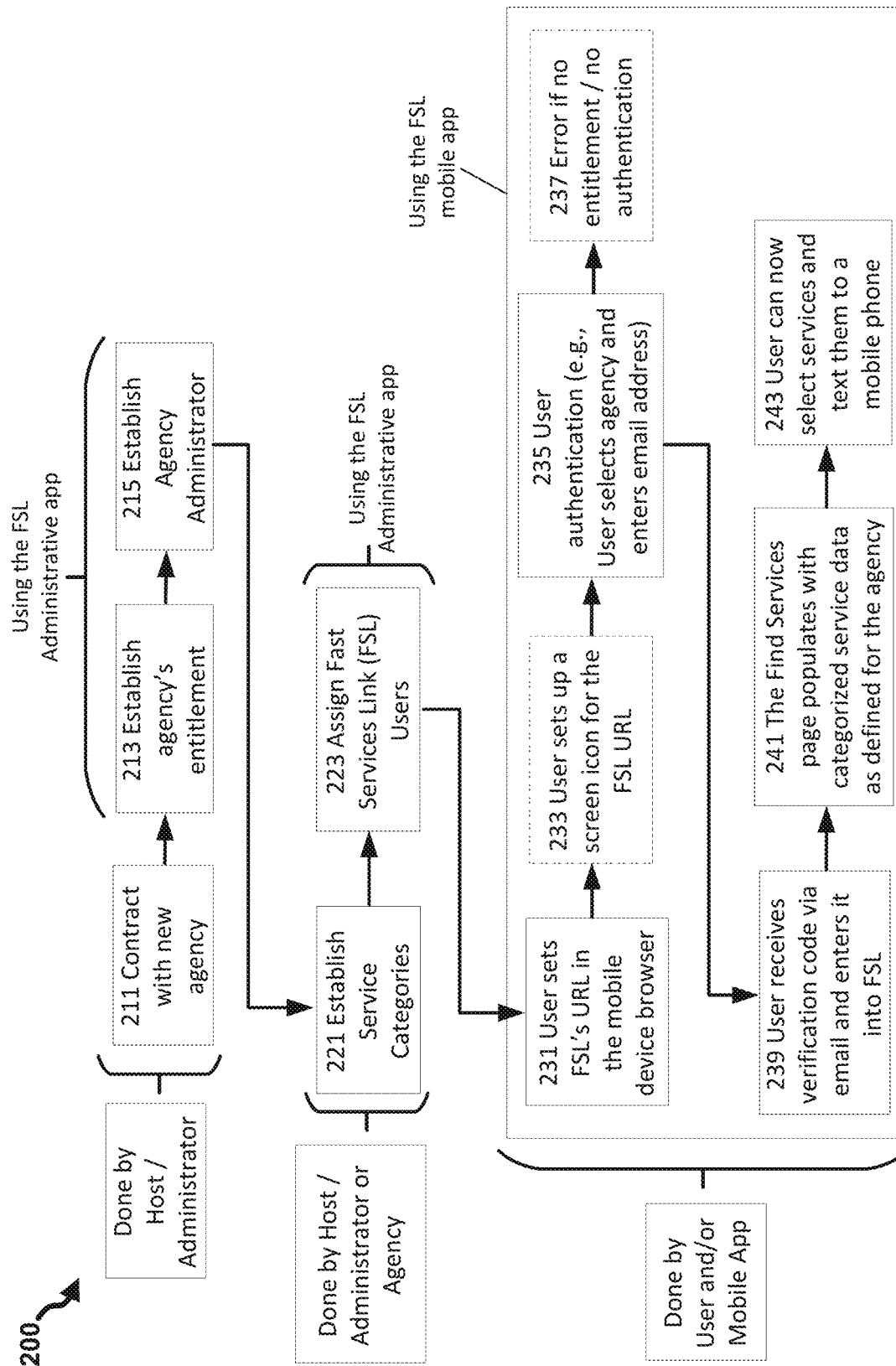
FIG. 2 is a flow diagram showing a process of registering a mobile software application ("mobile app") and interacting with the mobile software, according to some embodiments.

FSL application 130 is configured for use by a SRSO such as a law enforcement agency and its individual FSL users, as shown in the flow chart of FIG. 2. The process 200 of FIG. 2 includes steps for setting up FSL application 130 and for using FSL application 130. As shown in FIG. 2, some of the steps of process 200 are performed by an administrator interacting with administration server 110 and some other steps of process 200 are performed by the FSL application 130 and/or by an FSL user interacting with the FSL application 130.

At 211, a contract or other arrangement is established between a new agency and an administrator, the new agency seeking to make use of the FSL application 130. At 213, the administration server 110 (e.g., via a software application running thereon and/or via a human administrator) may determine, define, or establish an entitlement of the agency to use the FSL app. For example, the administration server 110 may be configured to determine whether the agency meets certain eligibility requirements, whether the agency is entitled to receive certain types of services information, whether the agency is authorized to define the categories of services that will be available for selection by their users, etc. In addition, in some embodiments, an FSL user associated with a law enforcement agency may have information related to criminal record of a particular recipient and such information may guide selection of the services for the recipient. Further, a user of a particular agency may be entitled to one or more services that may not be available to another agency. For example, a member of "mothers against drunk driving" may be entitled to services (e.g., services paid by donations of that organization) to which other users may not be entitled.

At 215, the administration server 110 may determine, define, or establish one or more agency administrators (e.g., an administrator may be configured to interact with agency server 120 to register the agency server 120 with the administration server 110). In various embodiments, steps 211-215 may be performed by an administrator interacting with a dashboard (herein, the dashboard may be any suitable application for configuring a server) of the administration server 110.

The process 200 further includes, at 221, establishing categories of services. For example, the categories of services may be groups of services that can be provided to the service recipients, with each group including a common type of service, as discussed herein. These categories may be established by an administrator of an agency server 120 (e.g., an administrator of the agency server 120 may create a profile that includes a list of groups of services that FSL application 130 is configured to provide for its users), by an administrator of the administration server 110, or based on a predefined template selected based on the type of agency being registered.

At 223, a list or set of users who are entitled to view information about the services provided by administrator server 110 (i.e., FSL users) may be defined (e.g., by the administrator of the agency server 120). In some cases, the list of users may be updated over time via the agency server 120. For example, an initial list of FSL users may be defined, and then as new FSL users join the agency (e.g., new police officers are hired) or FSL users leave the agency, the list of users may be dynamically updated (e.g., as users sign up to use the FSL application 130), optionally automatically in response to an update to a human resources database. In some cases, as described above, the administrator server 110 is configured to provide information about the services while agency server 120 is configured to provide information about the agency to the administrator server 110, as well as to collect various information about the users (although the latter can also be performed by the administrator server, alone or in combination with the agency server 120). In various implentations, steps 221 and 223 may be performed by agency server 120 (e.g., steps 221 and 223 may be performed by an administrator interacting with the dashboard (herein, the dashboard may be any suitable application for configuring a server) of the agency server 120).

Having two servers—an administrator server 110 and an agency server 120—can facilitate the division of tasks, e.g., the administrator server 110 may be configured to handle all requests related to services information and collect statistics associated with any users of the FSL application 130, while the agency server 120 may be configured to perform tasks associated with that particular agency (e.g., establish user lists, collect statistics associated with users of the agency that use the FSL application 130, facilitate selection and/or updates of services for the users of the agency, and/or the like). In some implementations, the administrator server 110 is not specifically affiliated with the agency (e.g., administrator server 110 may be configured to provide service information for many different agencies), while agency server 120 may be associated with only the agency. It should be noted, however, that in some cases, the administrator server 110 may be associated with the agency and may include agency server 120 (e.g., a single server may perform functions of both the administrator server 110 and the agency server 120).

In some embodiments, making the FSL application 130 accessible to users of an agency includes first registering the agency server 120 with the administration server 110, and second having users download the FSL application 130 or link to the FSL application 130 via their associated mobile devices/user devices. A user device may include, for example, a smart phone, a laptop computer, a desktop computer, a smart watch, an iPads, a tablet, and/or the like). In various implementations, the user device includes a geo-location/positioning device (e.g., a Global Positioning System (GPS) sensor) for determining location information (e.g., geolocation coordinates) of the user device during use. As further described below, the location information may be further used by communication system 100 to filter/down-select services (e.g., during compilation of the curated service information) prior to providing the services information to the FSL user.

The process 200 further includes, at 231, a user setting up the FSL application 130 on their user device, by either downloading the FSL application 130 to their user device, or by accessing the FSL application 130 via a website (i.e., as a web-hosted app) and optionally installing a hyperlinked icon (at 233) to a graphical user interface (GUI) of their user device. At 235, a user may select an agency and provide their credential(s) (e.g., including one or more of: email address, user phone, user identification, user identifier, agency name, agency identifier, etc.) for registering with the administration server 110 and/or with the agency server 120 (depending on the configuration of communication system 100, e.g., depending whether administration server 110 is associated with the agency), as part of an authentication process. If the administrator server 110 determines at 235 that the FSL user is either not entitled to use the FSL application 130 based on their entered credential(s) and/or if the authentication at 235 fails, an error message may automatically be generated and displayed, at 237, at one or more of the user device, the administration server 110, or the agency server 120, and/or the user may automatically be blocked from further attempts to access the FSL application 130. At 239, if authentication is successful, the FSL user may receive a verification code (e.g., the verification code may be sent to the user device or to the user's email to establish that the FSL user is in a possession of the user device that is being registered or to establish that the FSL user is in control of the specified user email) and enter it into the FSL application 130 interface displayed in the GUI of the user device. The FSL user may be authenticated by administration server 110 and/or agency server 120 in response to the FSL user entering the verification code (and/or a password that is selected by the user in addition to the verification code) via their user device. At 241, the user may begin using FSL application 130. For example, using the FSL application 130 can include selecting user-selectable, user-scrollable services presented via the FSL application 130 at 241. In various implementations, steps 231-237 are performed by the FSL user and/or the FSL application 130.

Figure 3A:
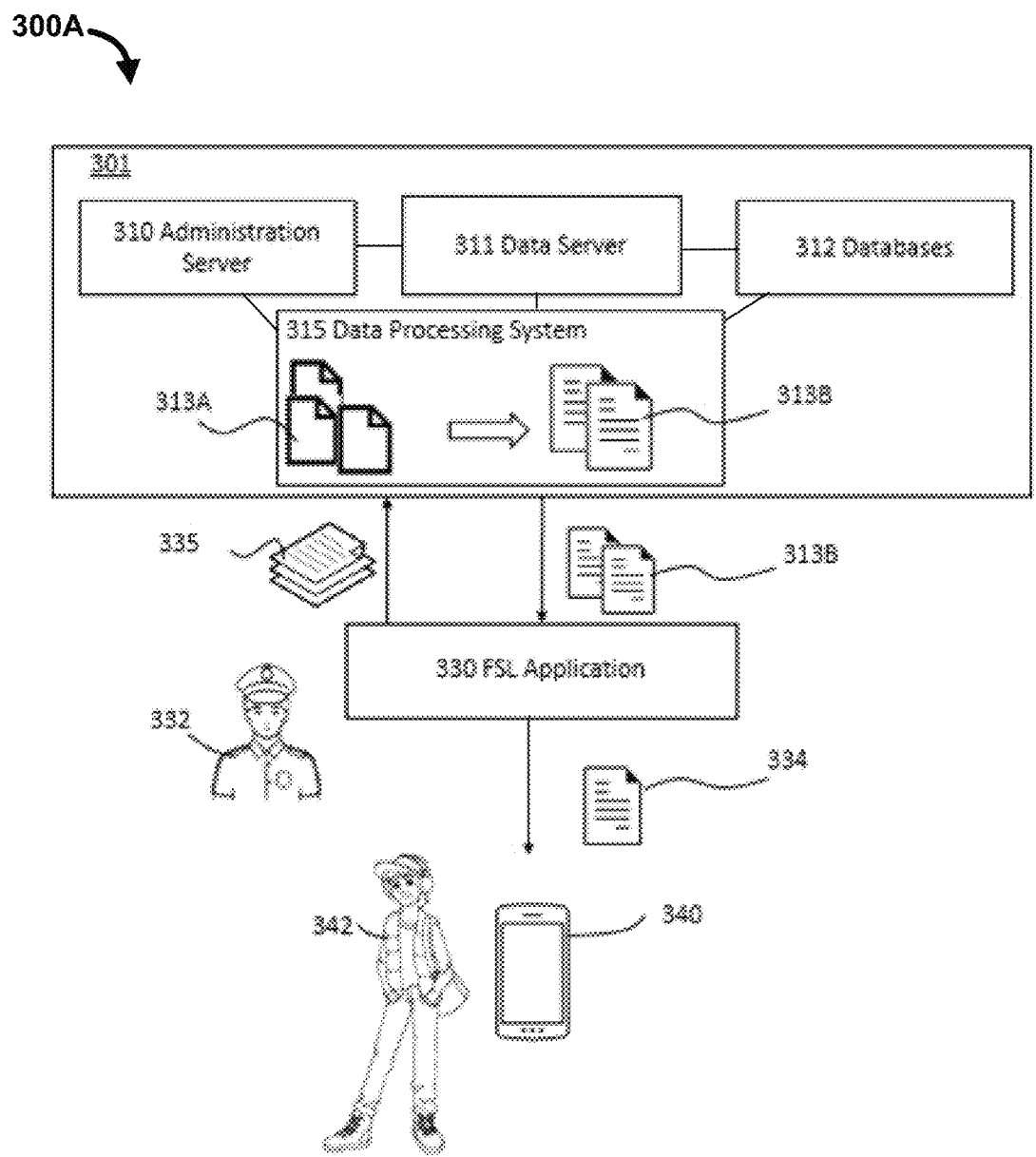
FIG. 3A is a flow diagram showing a first system configuration with data interactions among a variety of sources via the mobile app, according to some embodiments.

FIG. 3A shows an example communication system 300A including an administration services system 301 configured to interact/communication with an FSL application 330. Administration services system 301 includes an administration server 310 coupled to a data server 311 and databases 312 (optionally including one or more remote third-party databases; not shown in FIG. 3A). The components of the administration services system 301 may be co-located in some implementations, and may be geographically disperse (with only a subset of the components co-located) in other implementations. Databases 312 may be similar in form or in function to databases 112, as shown in FIG. 1A or 1B. In an example implementation, administration server 310 may be configured to perform at least some of the functions of an agency server. For example, administration server 310 may be configured to manage entitlements (e.g., determine entitlements, such as permissions for administrators, testers, agencies and users of communication system 300A). Further, administration server 310 may be configured to determine categories of services based on a type or name of an agency and/or users or types of users of the agency for which access to the FSL application 330 is being requested.

Data server 311 may be configured to provide data to the administration server 310 (e.g., data server 311 may include a suitable application (e.g., a data crawler) configured to interrogate other databases (e.g., databases 312) and retrieve curated service information that can be provided to the administration services system 301).

The administration services system 301 is configured to provide data to the FSL application 330 (e.g., via administration server 310). In various embodiments, the data may be processed (herein, such processing is also referred to as "distilling") by a data processing system 315. For example, the data processing system 315 may be configured to take unprocessed data 313A and distill (i.e., process) the unprocessed data 313A to produce distilled data 313B. The distilled data 313B can include information (e.g., curated information) about various services available for an FSL user 332 in a format that can be conveniently used by FSL user 332. For example, the distilled data 313B may be organized a format such as an expandable/collapsible content format (e.g., an expanded/collapsible list of groups of services). The distilling process may include filtering, reformatting, and/or reorganizing some or all of the unprocessed data 313A, as pertinent to a desired curated set of service information.

The distilled data 313B may include additional details (i.e., multiple levels or layers of detail) related to each of the services within the service information, and such details may likewise be presented in a format such as an expandable/collapsible content format. The distilled data 313B may include images, text, hyperlinks, click to call links, audio, video, or any other suitable multimedia content that can be used to inform FSL user 332 of the available services. The distilled data 313B may be transmitted to a user device for use by the FSL application 330, and/or may be transmitted to a web server hosting the FSL application 330 such that the distilled data 313B is accessible by users. It should be noted that distilling data using the data processing system 315 is only one possible approach, and other approaches for processing unprocessed data 313A are also contemplated. For example, data may be distilled by the FSL application 330 itself, wherever it is hosted, upon receiving unprocessed data 313A or at predetermined times.

The transmission of distilled data 313B to the user device and/or web server for use by the FSL application 330 may be performed over any suitable network (e.g., wireless network such as WiFi, Bluetooth, wireless broadband communication for mobile devices, radio waves, wired network, and the like). Further, as explained in greater detail below, in response to a FSL user 332 selecting information about a particular service for a potential services recipient 342, data 334 associated with the user's selection may be transmitted to a user device 340 of the potential services recipient 342. Device 340 may be any suitable electronic device for receiving data 334 (e.g., a smartphone, a tablet, a computer, etc.). In some cases, device 340 may receive the data 334 via any suitable network (e.g., wireless network such as WiFi, Bluetooth, wireless broadband communication for mobile devices, radio waves, wired network, and the like; not shown in FIG. 3A). Alternatively, in some cases, data 334 may be printed (e.g., the FSL user 332 may have a printer operably coupled to the FSL application 330, such that user 332 can trigger the printing of the data 334 on their printer), and the printed data may be directly given to the potential services recipient 342. In various embodiments, the FSL application 330 is configured not to provide any personal information (e.g., information uniquely identifying a sender, otherwise known as "self-identifying information") to the potential services recipient 342. For example, FSL application 330 may be configured not to provide information such as name, address, badge number, agency, or any other information that could be used to uniquely identify the FSL user 332. Further, FSL application 330 may be configured not to provide any information that can be used to infer the name, phone number, address, badge number, or any other self-identifying information of the FSL user 332 or of any other users of the agency that uses FSL application 330. Additionally, the FSL application 330 may be configured not to provide any information that can be used to infer the name, phone number, address, badge number, or any other self-identifying information of various recipients of services with which FSL user 332 or any other users of the agency that uses the FSL application 330 is interacting, has interacted in the past, or will be interacting.

FIG. 3A further shows that the FSL application 330 is configured to provide feedback data 335 to the administration services system 301. Such feedback data 335 can include, for example, various statistics about usage of the FSL application 330 (as further described below), which may affect the future availability, selectability and/or curation of data 313B (as further described below).

In some embodiments, data is acquired from the one or more databases 312 storing services information, as shown in FIG. 3A, which may include one or more remote third-party databases). The data from the databases 312 can be received at the data server 311, the data processing system 315, and/or the administration server 310 via an application programming interface (API) and/or via querying of the one or more databases 312. Each of the administration server 310, the data server 311, and the data processing system 315 may be implemented in hardware and/or software and include electronics for wireless and/or wireless communications with each other and with the FSL application 330. Once acquired, the data can be filtered and formatted to a set of STSRs that match the needs of each individual registered SRSO. The FSL user can select a number of STSRs that were found to be valuable to a service recipient, then text the next steps and other basic information about the STSR to a mobile device of the potential services recipient 342 and/or a mobile device of a designee (e.g., family member, friend, etc.) of the potential services recipient 342.

Figure 3B:
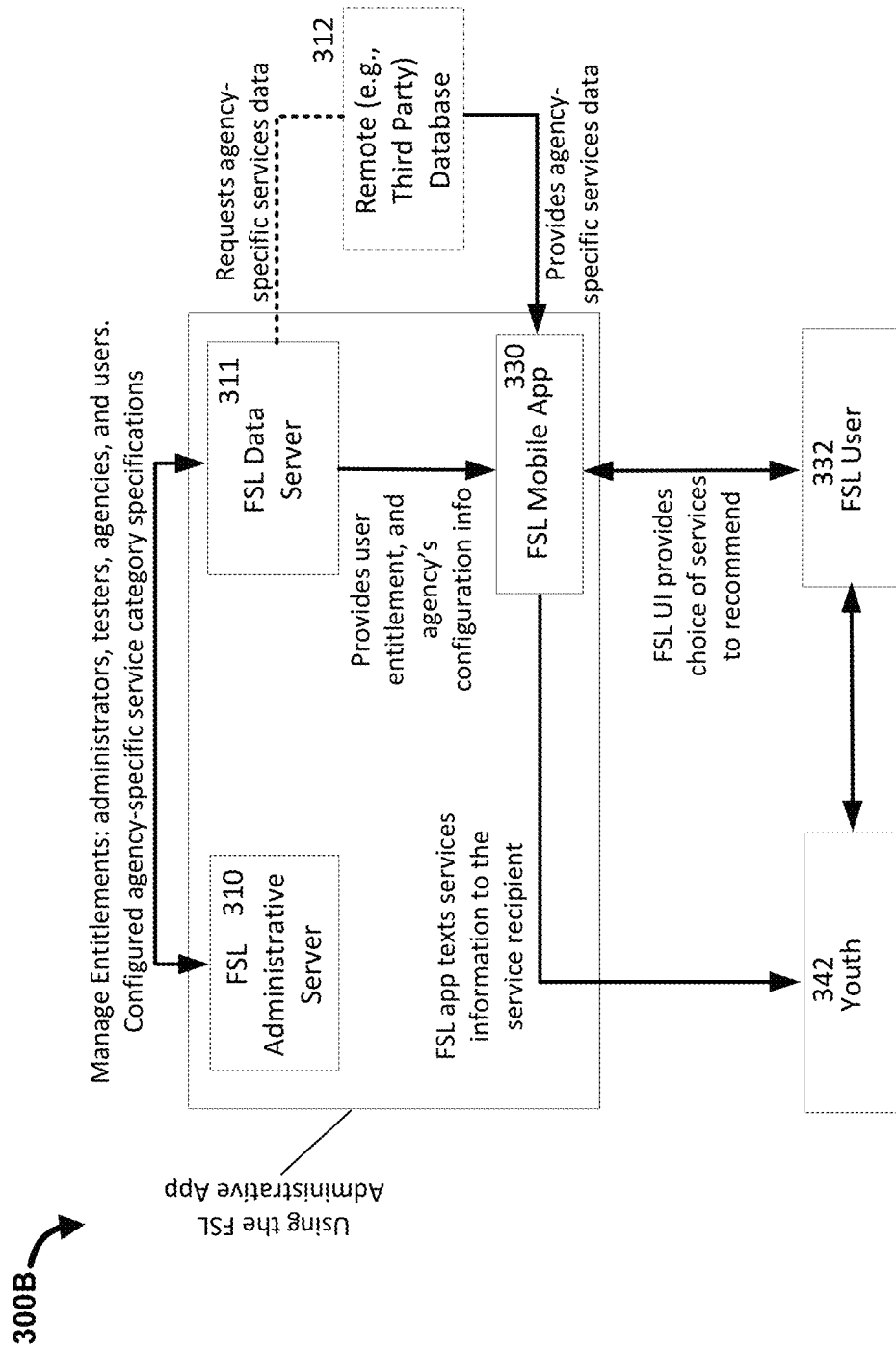
FIG. 3B is a flow diagram showing a second system configuration with data interactions among a variety of sources via the mobile app, according to some embodiments.

FIG. 3B is a flow diagram showing a second communication system 300B configuration, with data interactions among a variety of sources via the mobile app and similar functionality to the communication system 300A of FIG. 3A, according to some embodiments. As shown in FIG. 3B, the communication system 300B includes an FSL administrative server 310 operably coupled to an FSL data server, the FSL data server being operably coupled to an FSL mobile app 330. The FSL mobile app 330, in turn, can be configured to communicate with one or more potential services recipients 342 (labelled here as "youth") and/or one or more FSL users 332 via their user devices (as defined above). The interaction between the FSL data server 311 and the FSL administrative server 310 can include management of entitlement data/permissions for one or more administrators, testers, agencies, and other users. In addition, agency-specific service categories can be specified, defined, and/or configured. In some implementations, the management of entitlement data and/or the storage and implementation of agency-specific service categories (also referred to herein as "agency configuration data") may be performed by the FSL administrative server 310 based on data received from the FSL data server 311. The FSL data server 311 can be configured to provide user entitlement data and/or agency configuration data to the FSL mobile app 330, optionally in response to detecting a login, in response to a query or other type of request, in response to an update request, based on an update rule specifying an update frequency and/or type, etc. In other words, the FSL mobile app 330, during use, can retrieve user entitlement data (e.g., for authenticating users) from or via the FSL data server 311 and/or retrieve agency configuration data from or via the FSL data server 311 such that services data is presented in a predefined format associated with an agency of a user. Alternatively or in addition, the FSL data server 311 can be configured to provide agency-specific services data to one or more remote databases (optionally including one or more third-party databases) 312 and/or query the one or more remote databases 312, and the one or more remote databases 312 can provide agency-specific services data to the SL mobile app 330, optionally in response to detecting a login, in response to a query or other type of request, in response to an update request, based on an update rule specifying an update frequency and/or type, etc. When an FSL user 332 is using the FSL mobile app 330, they can interact with the FSL mobile app via user-navigable user interfaces (UIs) of a GUI of a user device of the FSL user 332, as shown and discussed with reference to FIGS. 7A-7AF, discussed below.

Figure 3C:
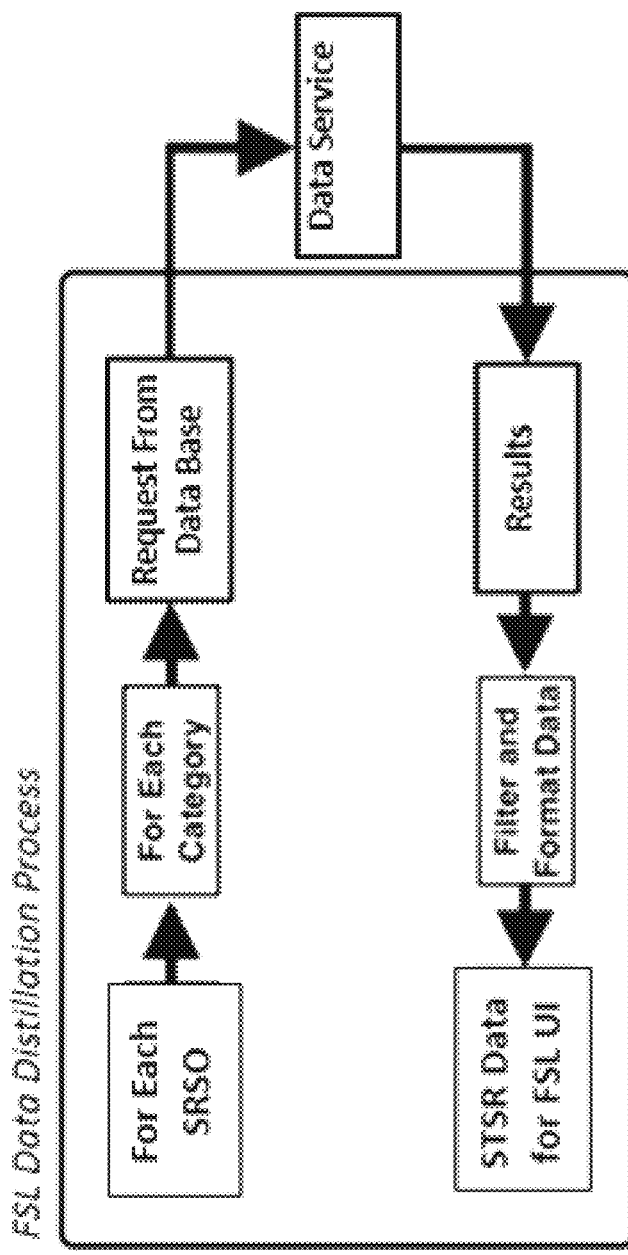
FIG. 3C is a flow diagram showing a data distillation process, according to some embodiments.

FIG. 3C is a flow diagram showing a FSL data distillation process, according to some embodiments. As shown in FIG. 3C, as part of the FSL data distillation process, a data service (optionally hosted, for example, by an administration server such as administration server 110 of FIG. 1) can query one or more databases based on one or more specified categories and for each available SRSO. The results retrieved as a result of the query can be filtered and/or reformatted, and made available for use as STSR data for presentation via one or more UIs of the FSL software application.

FSL App Workflow Recommendation

The following illustrates a proposed modification of the FSL app data flows, according to some embodiments.

In some implementations, the most computationally intensive part of the FSL app data flow occurs when data is gathered from the one or more databases for the categories desired by a SRSO. Once the data/information has been obtained, the FSL app (and/or a data service in communication with the FSL app) filters and formats the data/information for display in the user interface (UI) of the FSL app. This process can be referred to as "data distillation," as shown in FIG. 3C.

In some embodiments, a FSL data web service (an administration server such as administration server 110 or an agency server such as agency server 120 may perform functions of FSL data web service) stores configuration data for STSR categories that have been selected for each SRSO. The configuration data includes an indication of the type of data/information sought from the data service for each category, as well as how that data is filtered and formatted for use in the FSL user interface (UI). The configuration data can further specify the details of the distillation process.

In some embodiments, the distillation process occurs between the time of acquiring data from one or more databases or data sources of services, and the time of displaying the resulting (distilled) data in the FSL UI. The distillation process may be performed "locally" for each FSL user, i.e., on each individual SRSO user's mobile device (e.g., smartphone) and/or the distillation process may be performed on the FSL data web service. Differences between these approaches are discussed below.

Figure 4A:
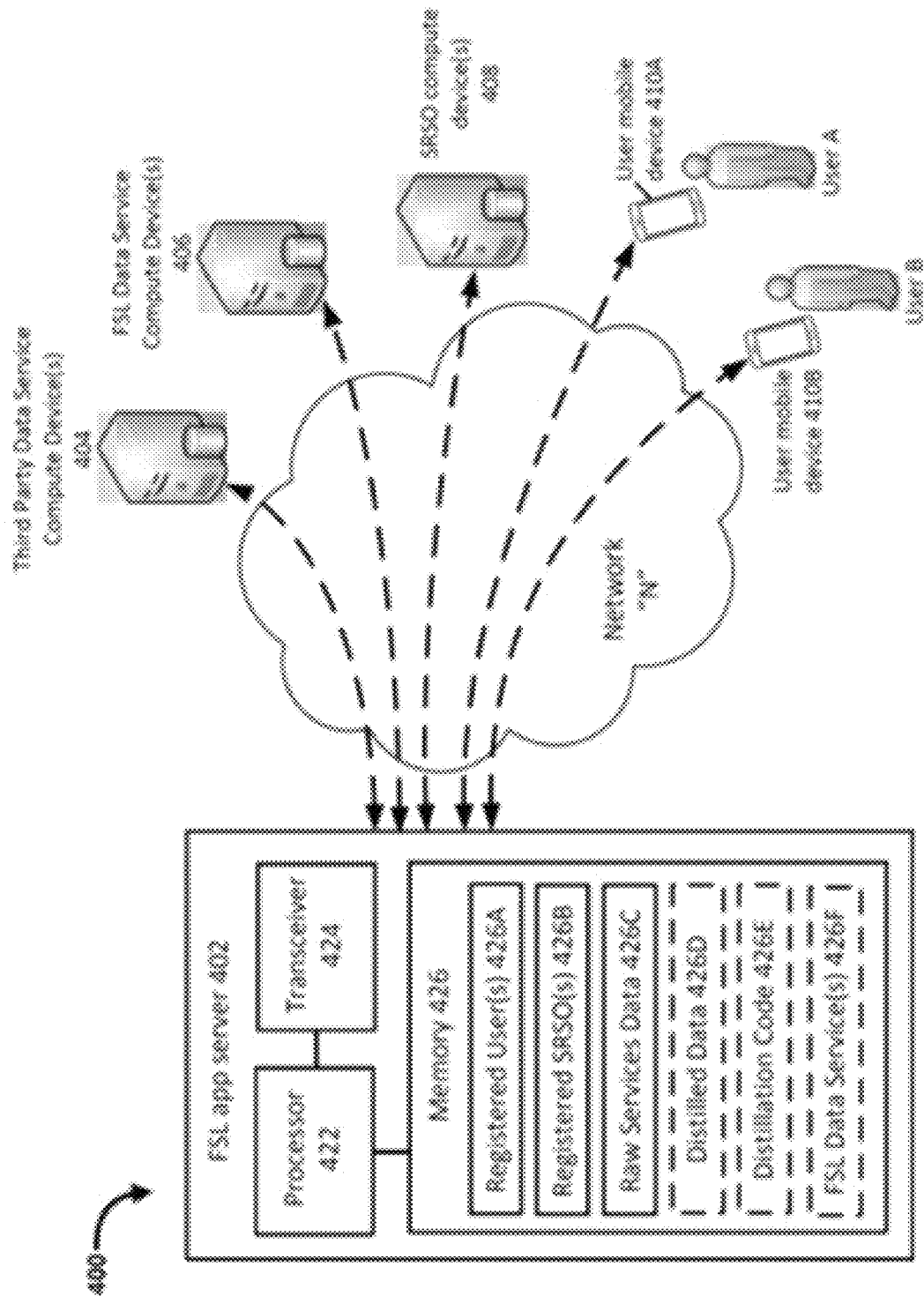
FIGS. 4A-4C are example system diagrams showing example networked systems, with data services and compute devices, according to some embodiments.
Figure 4B:
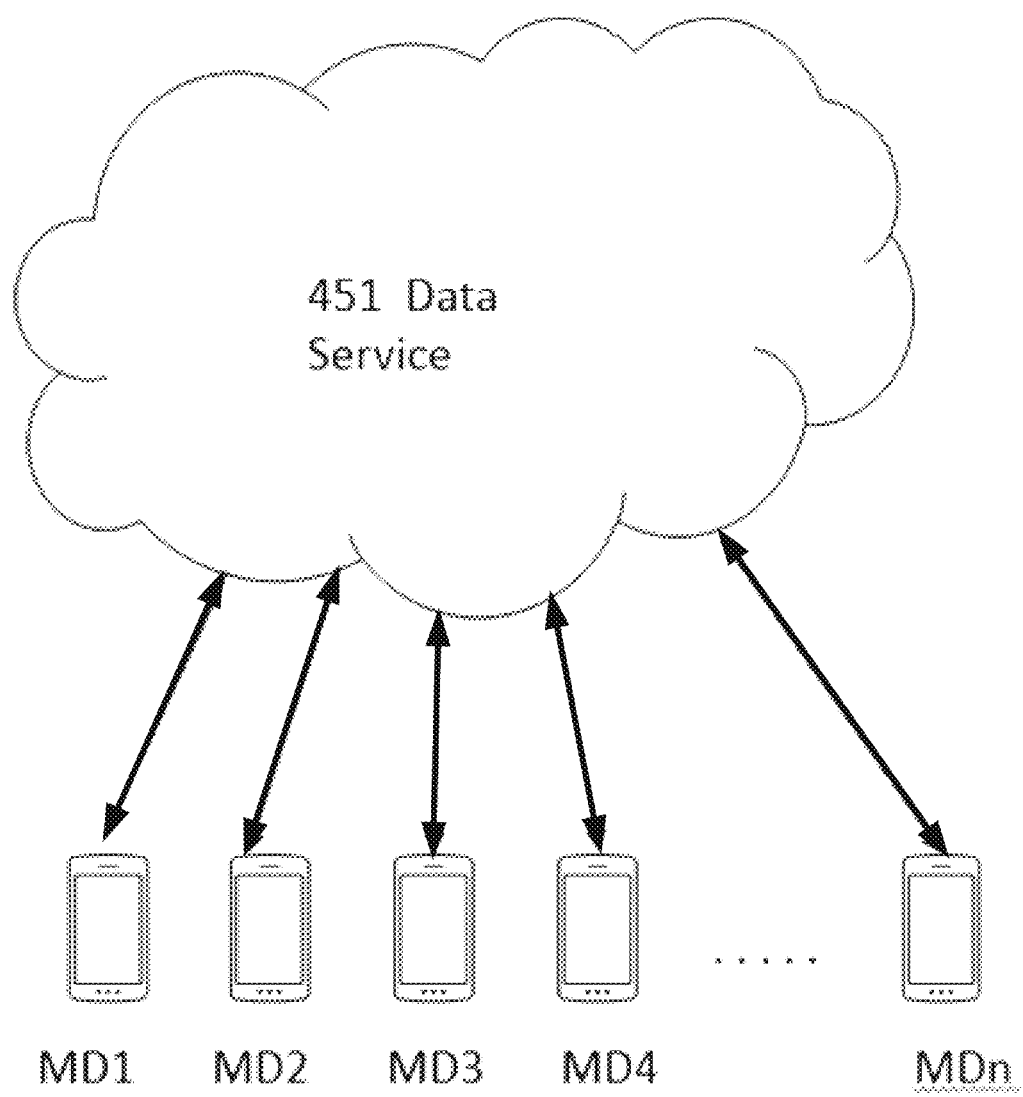
Figure 4C:
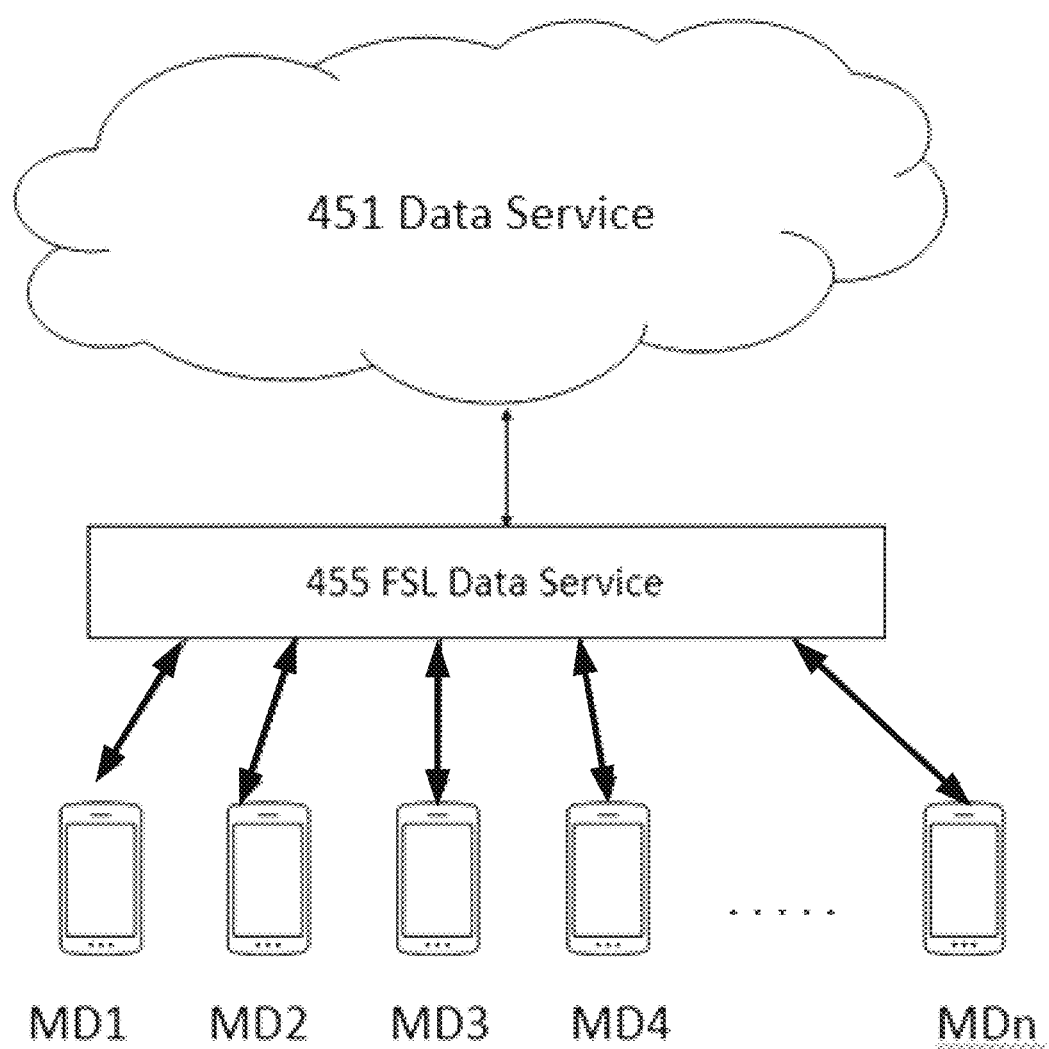

FIGS. 4A-4C are example system diagrams showing example networked systems, with data services and compute devices, according to some embodiments.

As shown in FIG. 4A, a networked system 400 can include a FSL application (appl) server 402 (e.g., FSL appl. server 402 may be similar in form or in function to administration server 110), one or more third party data service compute devices 404, one or more FSL data service compute devices 406, one or more SRSO compute devices 408, and multiple user mobile devices (410A, 410B) having associated users (users A and B, respectively) who may be law enforcement officers or other FSL users. Each of the FSL app server 402, the one or more third party data service compute devices 404, the one or more FSL data service compute devices 406, the one or more SRSO compute devices 408, and the multiple user mobile devices (410A, 410B) can communicate with another bidirectionally via a telecommunications network "N," which may include a wireless telecommunications network(s) and/or a wired telecommunications network(s). The FSL app server 402 includes a processor 422 that is communicably coupled to a transceiver 424 (for communications via the network N) and to a memory 426. The memory 426 can store data and/or program instructions (i.e., code) for execution by the processor 422. As shown in FIG. 4A, the memory 426 includes data for registered users 426A, data for registered SRSOs 426B, and raw services data 426C. The raw services data 426C can be generated/gathered locally to the FSL app server 402 and/or received from one or more of the third-party data service compute devices 404, the one or more FSL data service compute devices 406, the one or more SRSO compute devices 408, and the multiple user mobile devices (410A, 410B). The FSL app server 402 also optionally stores distilled data 426D (e.g., including a modified version of the raw services data or a subset thereof, for example obtained via filtering, reformatting, etc.), distillation code 426E (e.g., a program, executable by the processor 422, to automatically convert the raw services data 426C into the distilled data 426D), and FSL data services 426F. In other words, a data services function can be accomplished by any of the FSL app server 402, the one or more third party data service compute devices 404, or the one or more FSL data service compute devices 406 individually, or via any combination thereof.

In some cases, the distillation process performed by distillation code 426E is dependent on the API that is used for obtaining the service information from databases containing service-related data. In some cases, the service information includes metadata, such as tags. The tags may include service type tags (e.g., the service type tag may indicate that a particular service is a homeless shelter) and service attribute tags (e.g., the service attribute tag may be a physical abuse, probation, etc.). The distillation process may include determining or identifying/detecting tags for data entry related to a service, organizing data entries based on their associated tags, and eliminating data entries that have tags that are not related to services that are deemed relevant to the users of the agency/agencies associated with the FSL app server 402 and or that are not deemed relevant to a given current FSL user.

In some embodiments, as discussed below with reference to FIG. 4B, each of an SRSO's authorized mobile devices MD1-MDn uses the same process, based on the SRSO's specific configuration specifications, to populate the FSL categories using data service 451. Data service 451 may be provided via a suitable administration server (e.g., an administration server that can be similar in form or in function to the administration server 110) In other embodiments, also discussed below and with reference to FIG. 4C, the process for populating the FSL categories is performed on a FSL data service 455, in which case the redundancy of the previous approach is eliminated.

Approach #1:

In a first example approach, the FSL data distillation process is performed on each FSL user's mobile device. The double-headed arrows in FIG. 4B between data service 451 and mobile devices MD1-MDn indicate the high volume of web traffic interactions between data service 451 and the FSL app customer mobile devices when services data is being transferred. Data service 451 is configured to provide data (e.g., unprocessed data similar to data 313A) to the FSL applications of mobile devices MD1-MDn. This web traffic load scales proportionally to the number of FSL app customer mobile devices. In addition to this heavy load of web traffic, each mobile device in turn "distills" the services data into the desired FSL STSR data, and formats it to match the FSL data presentation specification.

The maximum time for the distillation process observed in tests was 0.1 seconds. The average of all 30 tests performed was much lower: 0.04 seconds. For data requests resulting in 0 to 5 STSRs, tests have found that the web download time can take from 0.5 to 3.3 seconds (15 trials). For data requests resulting in 6 to 10 STSRs, tests have found that the web download time can take from 0.9 to 2.1 seconds (9 trials). For data requests resulting in 11 to 74 STSRs, tests have found that the web download time can take from 1.7 to 8.4 seconds. (6 trials).

Approach #2:

In a second example approach, the FSL data distillation process is performed on/by a FSL data service 455, as shown in FIG. 4C, and the results are subsequently delivered to each mobile device. In an example implementation, FSL data service 455 may be performed by a suitable data processing system (e.g., data processing system similar to data processing system 315, as shown in FIG. 3). This can result in faster data retrieval, faster distillation, and/or faster delivery of distilled data to FSL users via the FSL app.

Since each SRSO may have numerous associated mobile devices (e.g., hundreds of mobile devices), the system of FIG. 4C may be desirable, in that the mobile devices do not perform the data distillation. Other benefits of moving the distillation process to the FSL data service 455 include, but are not limited to:

A substantial reduction in the overall computational load;
Elimination of duplicate computation;
Distilled data can be downloaded from the FSL web data service automatically when the app "wakes up," without any interruption to the workflow;
Computational overhead associated with data distillation is eliminated from each FSL user's mobile device;
The time taken to update each mobile device with the data when needed is minimized;
Noticeable time lags when opening and closing category listings in the FSL app can be reduced or eliminated;
Updates to each mobile device can still be done in the background at an agreed upon frequency as long as there is a stable internet connection;
Lower demands on the data service, since each category is updated once, for all impacted mobile devices, rather than once per mobile device;
The frequency of updating each SRSO's STSR data can be set to an agreed value, to minimize the use out-of-date STSR data;
The distillation process can be performed on a hosted server that is more computationally powerful than any mobile device;
The distillation process can be monitored and improved more effectively on a single hosted server than it could be on each mobile device; and
Once a mobile device is updated with its SRSO's STSR data, it remains functional even after an expected update fails, such that data is available even when there is a failure to update, a lack of internet access, or some other system failure. This can reduce or eliminate the impact of unreliable internet access in the field.

In some embodiments, where the distillation process is performed on a hosted server, the length of time the distilled data is kept "alive" can be the same as it would be when the data is distilled on each individual mobile device, and the load in transmitting the distilled UI data to the mobile devices can be minimized (or reduced) by using the FSL data service. The interaction with the one or more databases (i.e., data services), and hence, the computational load, can be approximately proportional to the number of categories being populated when distillation is performed by the FSL data service, and thus the computational load is no longer proportional to the larger (perhaps hundreds of times larger) number of FSL user's mobile devices.

As described in reference to FIG. 3A, FSL application 330 may be configured to provide feedback data 335 to the administration services system 301, which is configured to prepare data 313A and/or 313B. The feedback data 335 may include any suitable data associated with the usage of FSL application 330. For example, the feedback data 335 can include a type or types of service 334 requested at a particular location, a number of queries received from or processed by a FSL user 332 for a particular service (e.g., service 334), a description of a recipient 342 (e.g., the description of recipient 342 may include age, occupation, physical characteristics, psychological profile, nationality, race, language of communication of recipient 342, level of agitation, education, address, phone, name, and/or any other descriptive information of recipient 342). In some cases, the feedback data 335 may include descriptions of needs of the recipient 342, law defying actions performed by recipient 342, or any actions performed by recipient 342 (e.g., such actions may include begging, shooting, fighting, biting, wielding a knife, singing, dancing, painting graffiti, yelling, or any other suitable actions).

Figure 5:
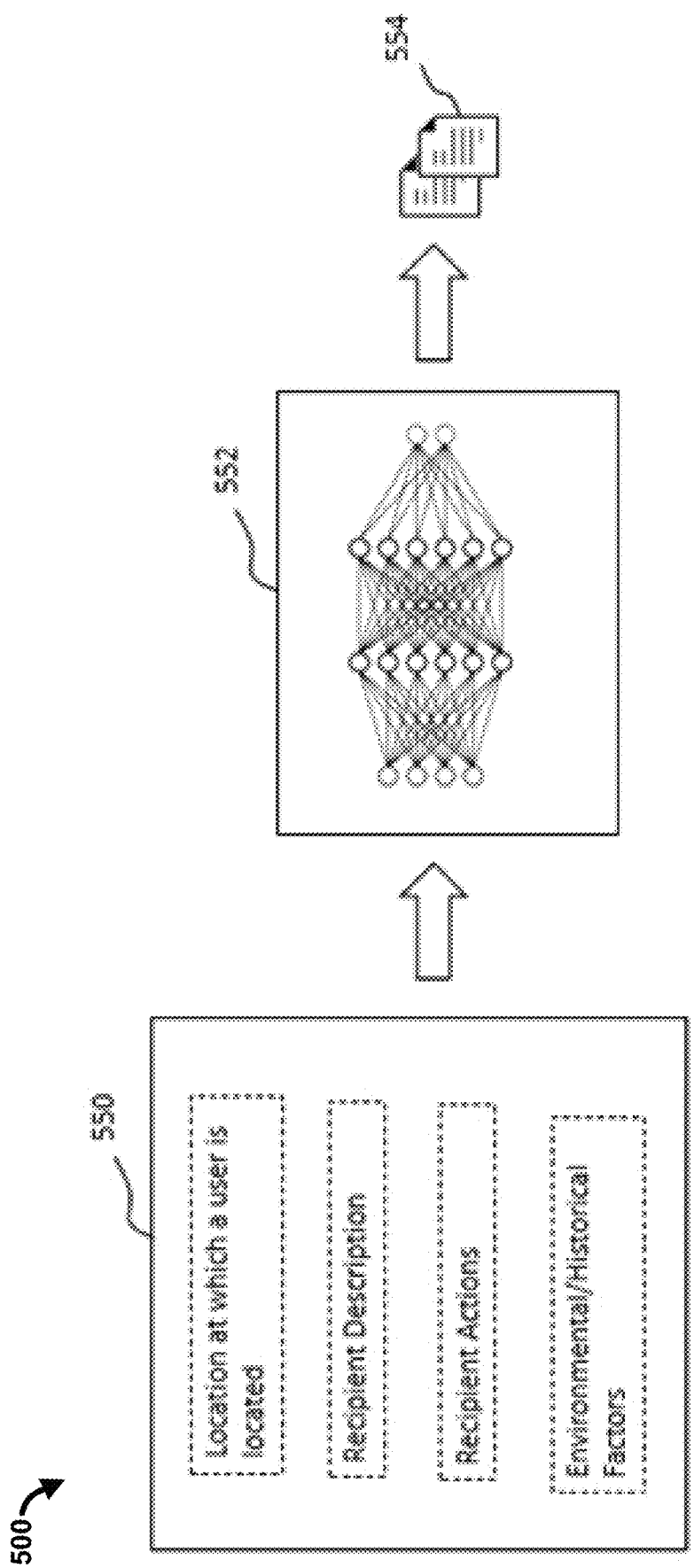
FIG. 5 is a diagram showing an example machine learning method for providing distilled service information, according to an embodiment.

FIG. 5 shows an example data processing system 500 that may be implemented using a machine learning model (e.g., an artificial intelligence system 552) and configured to take as an input data 550 and automatically generate/output distilled services data 554. Input data 550 may include elements of the feedback data 335 discussed above. For example, input data 550 may include one or more of the following: a location at which an FSL user is currently/contemporaneously located, a description of a potential recipient of a service, one or more actions performed by the potential recipient of the service, and or environmental and/or historical factors which may influence the type of service that may be provided for the potential recipient of the service. The environmental factors may include weather at the location (or elsewhere), time of the day at the location (or elsewhere), number of people at the location (or other locations), and/or the like. The historical factors may include events that previously occurred, are occurring in parallel, or that are expected to happen in the future at a given location (or elsewhere). Such events may include concerts, sports events, traffic, natural disasters, etc. In one implementation, the artificial intelligence system may include a neural network model (e.g., a recurrent neural network, a convolutional neural network, a generative adversarial network, a model based on decision trees, a model based on ensemble methods such as random forests, generative adversarial network (GAN), or an information theoretic extension to the GAN (InfoGAN)). The number of features and number of layers in a GAN or an InfoGAN may be selected (or optimized) to improve the model's performance.

Artificial intelligence system 552 may be trained using any suitable means. For example, artificial intelligence system 552 may be trained using various hypothetical scenarios, and/or using feedback received from one or more users of an FSL application. In some cases, the hypothetical scenarios may be generated by a suitable neural network, or by any other suitable algorithm.

Figure 6:
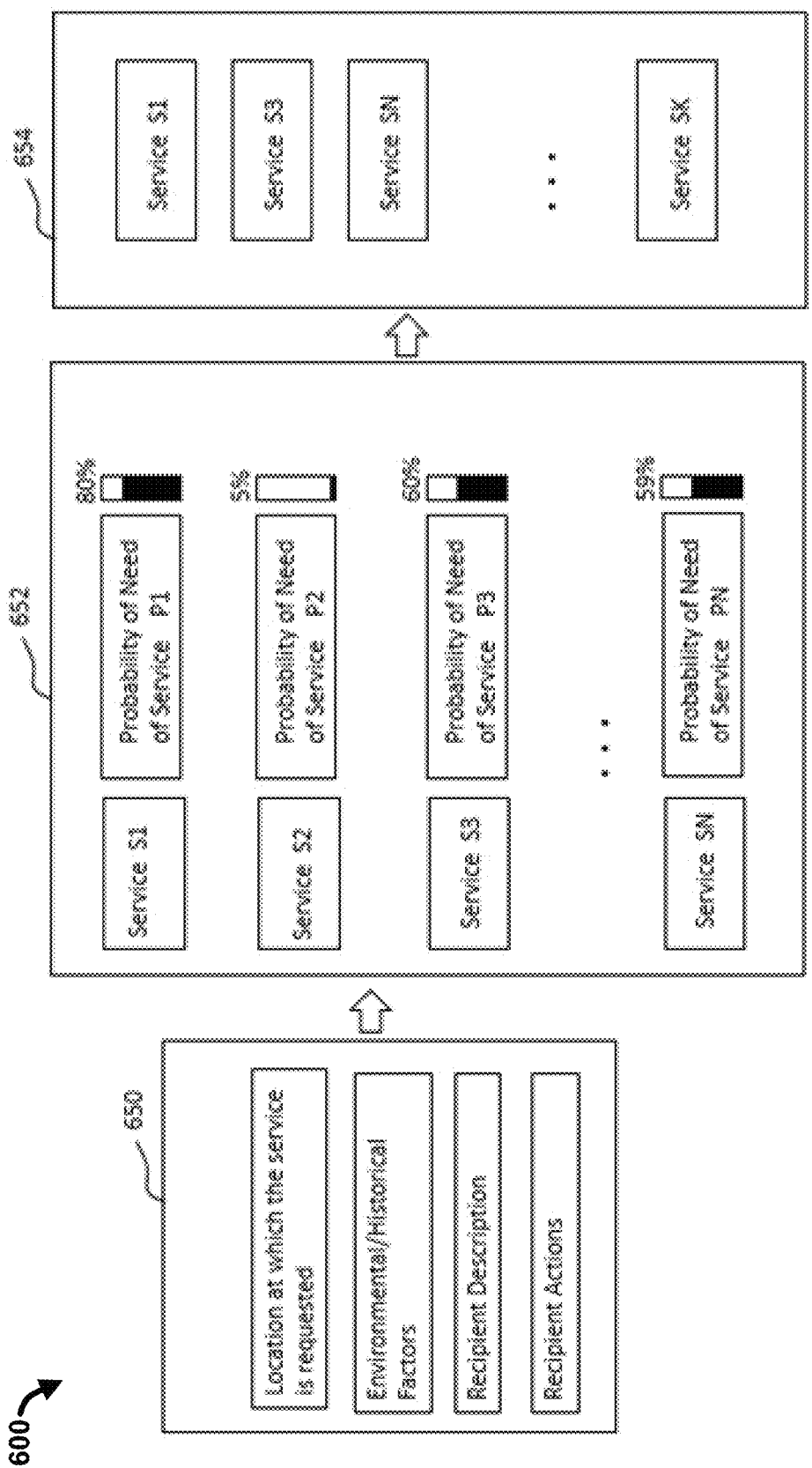
FIG. 6 is an example data processing system for providing distilled service information to system users, according to an embodiment.

FIG. 6 is an example data processing system for providing distilled service information to system users, according to an embodiment. As shown in FIG. 6, a data processing system 652 receives input data 650, which may be similar or the same as input data 550. Data processing system 652 may be configured to determine a probability of a suitability of a service (also referred to herein as a "probability of need for service") for a potential recipient of services based on the input 650. In some cases, the data processing system 652 may be configured to perform one or more administrator services (e.g., data processing system 652 may be similar to data processing system 315 of the administration services system 301, as shown in FIG. 3). Alternatively, data processing system 652 may be part of a FSL application and may receive updates from an administration server and/or data processing system.

As shown in FIG. 6, the probability of need for service S1 (services S1 through SN being types of services available for selection via the FSL app) may be 80%, the probability of need for service S2 may be 5%, the probability of need for service S3 may be 60%, and the probability of need for service SN may be 59%. Data processing system 652 may then be configured to list services in a descending ordered list 654 (e.g., with services having higher probabilities at the top and lower probabilities at the bottom of the list). In some implementations, only a predefined number of services is displayed via the FSL app per page (e.g., only 2, 3, 4, 5, 6, 7, 8, 9, or 10 services are shown per page). The list 654 may include distilled data (e.g., the distilled data may be similar to distilled data 313B, as shown in FIG. 3) and/or curated service information. In various embodiments, each entry (herein also referred to as a "record") in list 654 (e.g., each one of services S1-SK) may include expandable/collapsible content.

In various implementations, estimation of probabilities for data processing system 652 may be determined using historical data based on a correlation of particular input data with particular curated service information selected by an FSL user. Such determination of probabilities based on the historical data is formulated based on an "experience" of FSL users when these FSL users encounter recipients. In some cases, the probabilities may be determined based on actions of a single FSL user, and in other cases, such probabilities may be determined by combined actions of FSL users of a particular agency. For example, if input data corresponding to a teenager (teenager is a description of a recipient) sleeping/unconscious on a bench (sleeping is a description of an action of the recipient) in a downtown of Los Angeles (location of the recipient) results in that teenager being referred to recommended to attend a drug rehabilitation program, then probability of suggesting drug rehabilitation programs to another teenager (e.g., suggested service of the recipient) who is also found sleeping in downtown Los Angeles may be determined to be high based on previously collected historical data. It should be noted that input data 650 for which probabilities P1-PN are determined may not be identical to previously collected historical input data for different encounters with various recipients, and the probabilities P1-PN are determined based on overlap of input data 650 with historical input data (e.g., if there is a large overlap of input data 650 with a particular one of historical input data, then services used for that historical input data are likely to be applicable to a recipient an encounter with whom is descried by input data 650).

It should be noted instead of specific services S1-SN, data processing system 652 may be configured to list one or more "groups" of services S1-SN. For example, S1 may correspond to a group of services associated with shelters, S2 may correspond to a group of services associated with medical services, S3 may correspond to a group of services associated with clothes, and SN may correspond to a group of services associated with food services.

In various implementations, as described above, distilled output data 654 may include entries with at least some of the entries including an expandable/collapsible content. In some cases, the expandable/collapsible content include further details about the services. Such details may form nested sub-lists, which can also be expandable/collapsible. In various implementations, any suitable number of nested sub-lists may be used. The nested sub-list may include details of the services (e.g., distances to each service in a list of services forming the expandable/collapsible content, type of services, and the like, as further described below in relation to FIGS. 7A-7AF). Further, the ordering of these nested sub-lists may also be based on probabilities associated with input data 650. For example, if input data 650 includes meeting a recipient in a downtown of Los Angeles, then a group of services S1 associated with shelter may include a nested sub-list of shelters sorted by a distance from a location of the recipient.

It should be appreciated that distilled data (e.g., distilled output data 654, as shown in FIG. 6) may be updated for the user of an FSL application automatically based on a variety of factors such as a location of the user, a time of the day, and the like. In some cases, when FSL application is installed on a device that includes visual or audio sensors, the distilled output data 654 may be updated based on data recorded by these sensors (e.g., if there is a commotion detected in a proximity of a law enforcement officer—the user of the FSL application based on audio/video input from the environment of the law enforcement officer, a button for requesting a backup may be presented to the law enforcement officer). In some cases, besides audio/video sensors, physiological sensors may be also employed (e.g., sensors for detecting pulse of a user, blood pressure of the user, breathing rate of the user, and the like) as part of the input data 650. For example, such sensors may be available as smart watches, wearable cameras, or any other wearable sensors that can be coupled to a device on which FSL application is installed.

In various embodiments, at least some data of input data 650 may be entered by a user of the FSL application based on encounter information with a recipient. Other data, such as location and time of the encounter may be determined automatically. In some cases, for expedience, shortcut commands (code) may be available for entering the data related to input data 650. For example, the user may enter (vehicle, teen, DUI) as a shortcut describing encounter with a teenager drunk driver. Upon entering these commands (which may be similar to a query string, and may include Boolean operations such as AND, OR, etc.), data processing system 652 is configured to determine distilled output data 654. In various implementations, the default order of services S1-SN listed as indicated by distilled output data 654 is based on the assumed need of the agency with which the users of the FSL application are affiliated.

In various embodiments, FSL application may be a web-based application (e.g., a progressive web app) that upon installing is accessible by pressing an icon on an electronic device of a user. In various implementations, FSL application is automatically updatable (e.g., new features can be released seamlessly without a need for the user to reinstall the application).

The FSL application is also configured to take feedback from a user, to allow user to leave notes related to encounters with recipients and services requested during these encounters, as well as sharing the feedback and notes between users of the same agency. In some cases, the notes may be about a service that is available for recipients (e.g., names of people who are responsible for the service, personal conduct during the service (when such information is available to the user), wait time for the service, availability of the service, hours of operation for the service, quality of the service, capacity of the service (e.g., how many people can receive the service within a period of time), or any other characteristics about the service (e.g., how easy it is to locate the service)). In some cases, users may be allowed to upvote or downvote a service and/or manually organize service listings (e.g., listings of services S1-SN of distilled output data 654). The upvoting/downvoting information about the services from the users, as well as information about personal preferences in organizing service listings may be collected for different users by data processing system 652 to further alter values for probabilities P1-PN. Further, the feedback may include usage statistics by the user, which may be stored together with user-identified information (e.g., with the user's email).

Additionally, or alternatively, notes may describe an encounter with a recipient. For example, the note may state "third encounter with teenager <John Doe> this week, the teenager is 17 years old, under the influence and driving." Note that brackets about a name <John Doe> may indicate to the system a personal information contained in the notes that should be removed when sharing this information with other users/organization, service providers and the like. These brackets (or any other means for identifying personal information) may be provided by the user as the user leaves notes for the FSL application. Any other notes may also be entered about environment, or historical events during encounters with the recipients (e.g., the note may include "a smell of a gas leak is detected," "a loud screeching noise is observed," "found a bloody knife," and the like).

Further, the notes may include comments on performance of the FSL application and/or performance of the administration services associated with the FSL application (e.g., performance of the data processing system 652). Further, the notes may include request for new features. In some cases, the notes or any other information entered into the FSL application may be retained locally and transmitted to the administrative services for the FSL application when the FSL application is online (e.g., is capable of communicating with the administrative services via a suitable network).

In some cases, the FSL application is configured to track at least some of the activity of the users (e.g., what services are requested by the users, what information about the services are shared with the recipients and/or with other users of the FSL application, which users are recommending which services, at which locations the services are requested, at what time of the day the services are requested, and the like).

In various implementations, the FSL application provides a reset functionality. The reset functionality allows clearing all of the data (e.g., cached data, data history, and the like). The reset functionality may be performed by pressing a suitable reset button (or a suitable graphical user interface) or using any other suitable approach for interacting with graphical user elements of the FSL application (e.g., using gestures that can be interpreted appropriately by the FSL application, when the FSL application is installed on a user device that includes a touch screen). The reset functionality may be configured to reload service information, update service information and/or upload data from a server (e.g., some cache data). Further, the reset functionality may facilitate bug fixes. In some cases, in addition to using the reset functionality, the FSL application may be stopped, shut down, started, restarted, and the like. Additionally, the FSL application may be reloaded, uninstalled, or reinstalled.

In some cases, the FSL application may be updated when while the user is not actively using the FSL application to prevent interrupting the activities of the user. For example, prior to updating the FSL application, a note may appear requesting the user to update the FSL application or postpone updates to the FSL application.

In some cases, administrative services for the FSL application can whitelist or blacklist a particular user. For example, any user that is not whitelisted may not be able to use FSL application, and any user that has been blacklisted may not be able to use the FSL application.

In some cases, administrative services may analyze notes left by various users and determine whether the notes should be distributed to other users. In some cases, the notes may be analyzed via one or more human operators (human administrators) of the administrative services, and in other cases, the notes may be computationally processed using, for example, natural language processing models. In some cases, a note may need to be approved (e.g., a note may need to be checked for an absence of a foul language) prior to distributing the note to other users. In some instances, personal information that can be inferred in the note may need to be removed prior to the note being redistributing to other users.

In some cases, administrative services for the FSL application can whitelist or blacklist a particular user. For example, any user that is not whitelisted may not be able to use FSL application, and any user that has been blacklisted may not be able to use the FSL application.

Figure 7F:
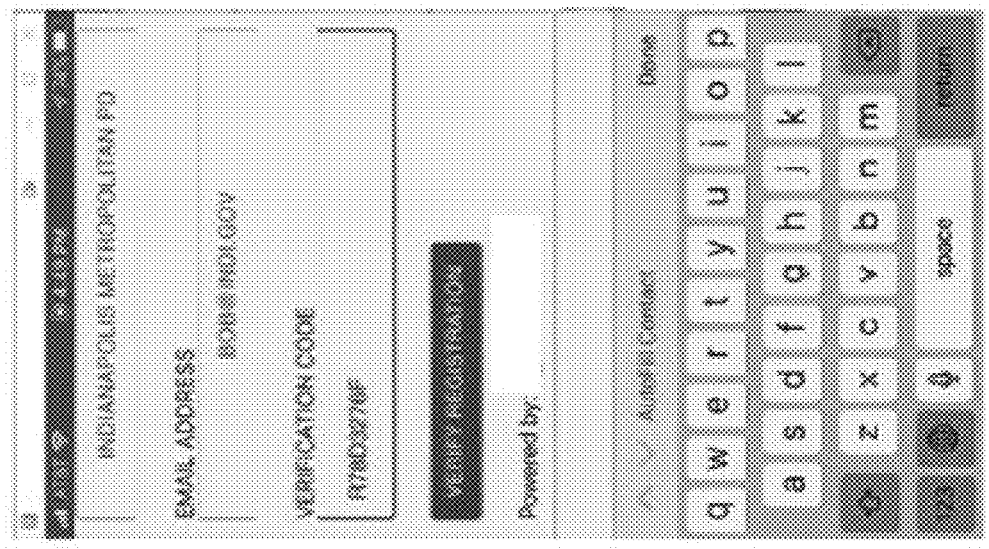
Figure 7E:
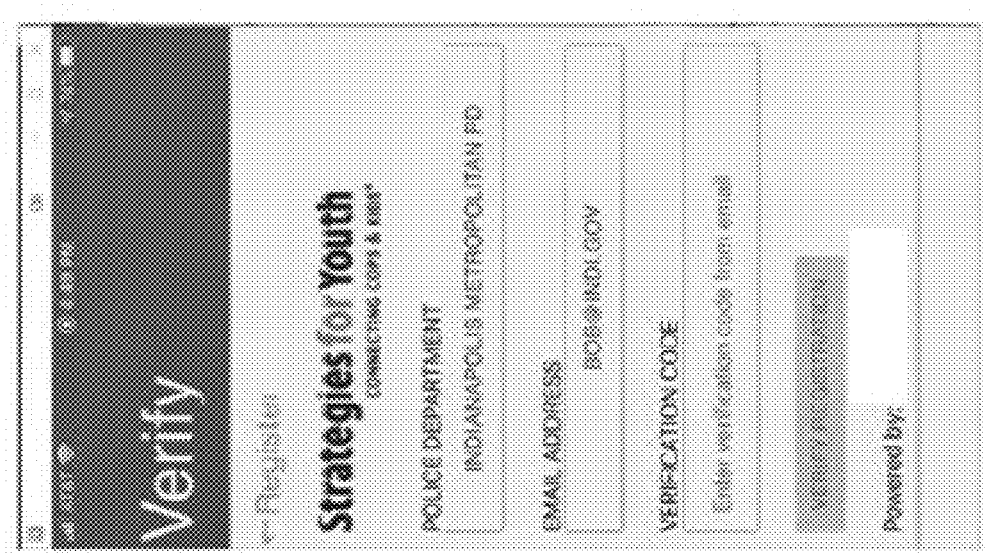
Figures 7G, 7H:
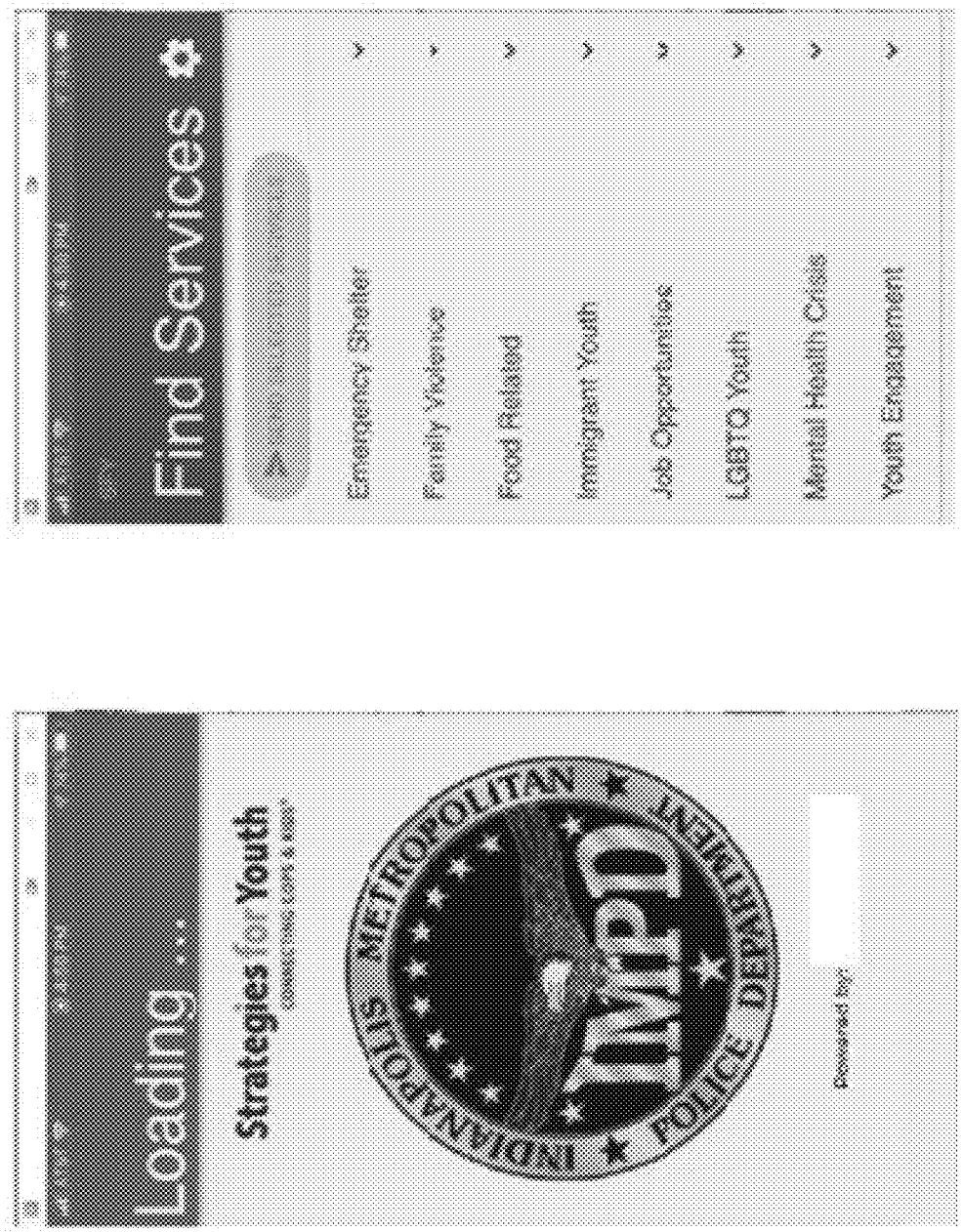
Figure 7J:
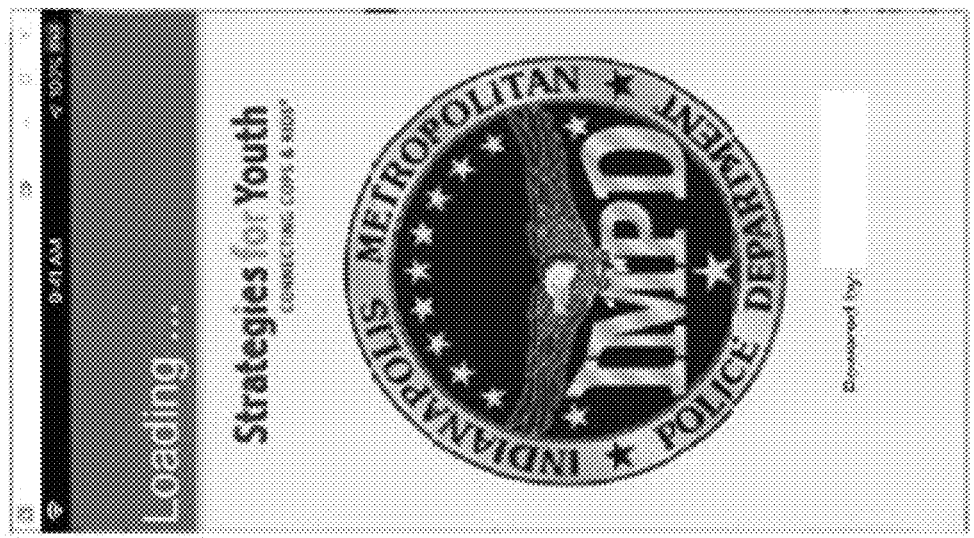
Figure 7I:
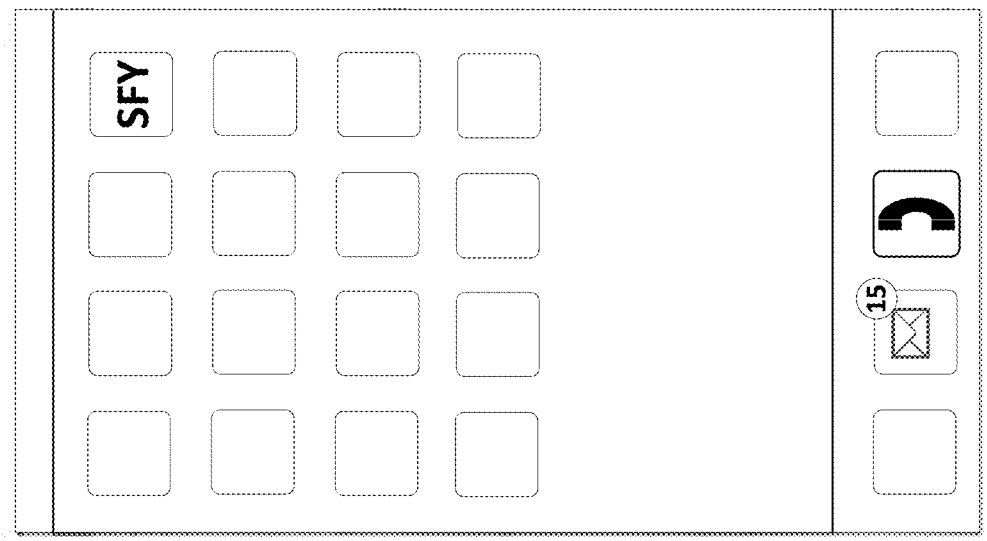
Figure 7L:
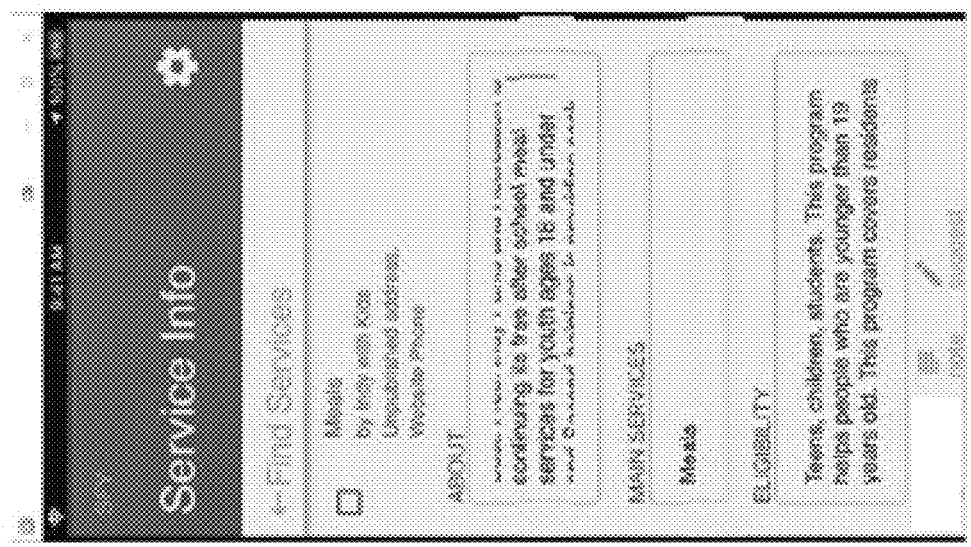
Figure 7K:
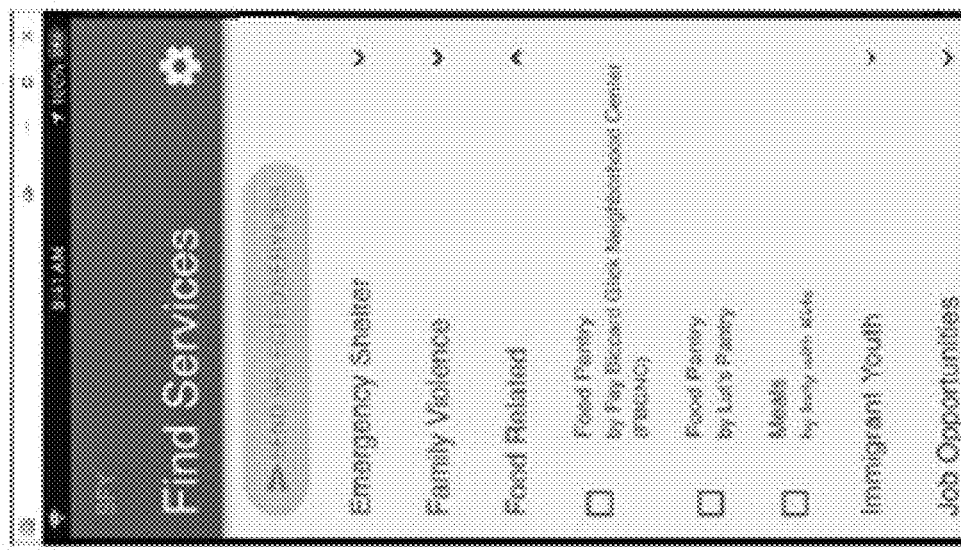
Figure 7N:
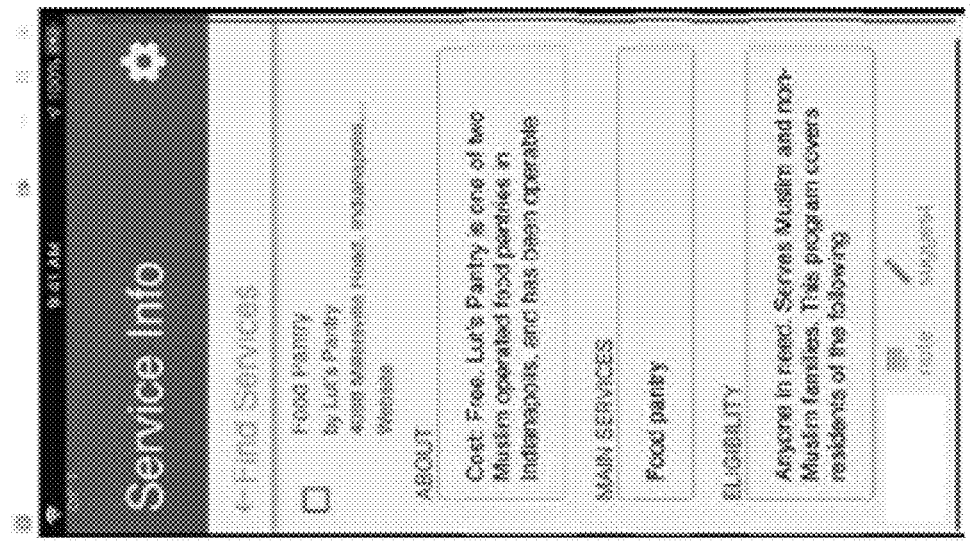
Figure 7M:
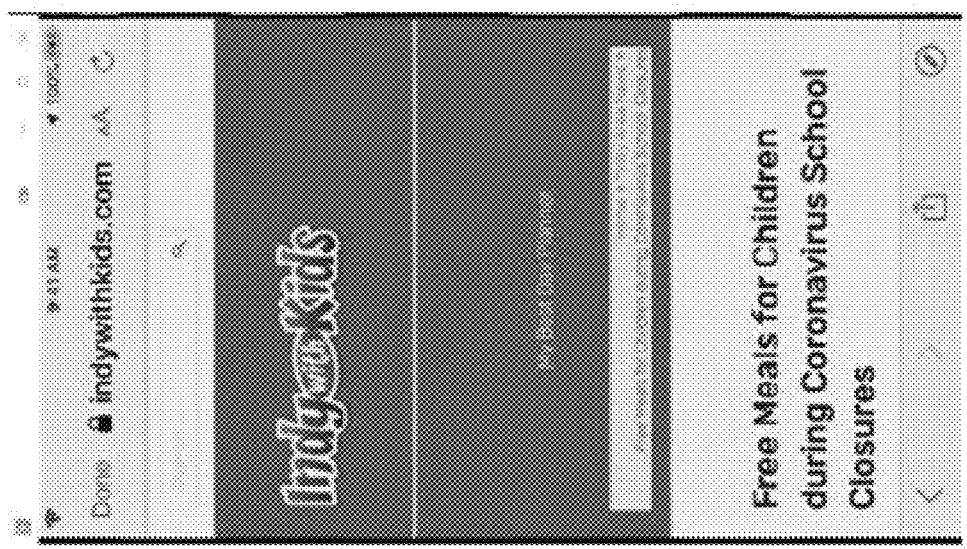

FIGS. 7A-7AF are example graphical user interface (GUI) screens of the mobile FSL application, according to some embodiments. The GUIs of FIGS. 7A-7AE show a wide range of functionalities of the FSL app. FIG. 7A shows a first registration step for the FSL application in which a user is configured to create an account, FIG. 7B shows a second registration step for the FSL application in which the user selects his/her agency (e.g., a police department), FIGS. 7C-7D show the user entering his/her email address, and FIGS. 7E-7F shows steps of entering a verification code (which can be send to the user after the user completes first two registration steps), for authenticating the user with the FSL application. FIGS. 7G and 7H show views of the FSL application during loading of services (FIG. 7G) and when presenting the list of services to the user (FIG. 7H). FIG. 7I shows a view of an icon of the FSL application on a screen of the electronic device of the user, and FIG. 7J shows a view of the FSL application at the start of the FSL application. FIG. 7K shows an example view of a "pull-down" or "drop-down" list for food related services that include a list of the food services in the proximity of the user including the service "Meals," and FIG. 7L shows a description of the service "Meals" including information about the service as well as the eligibility for the service (e.g., teens, students, and children are eligible). FIGS. 7M-7N show description of another service "Food Pantry by Lut's Pantry," including information about the service, main service type and the eligibility for the service. In some embodiments, when any of an address, a phone number, or a website is displayed via the GUI of the mobile FSL application, the text associated with the address, phone number, or website is displayed as a "live link" (e.g., to a map software application of the mobile device on which the GUI is displayed, to a phone capability/software application of the mobile device, or to a web browser of the mobile device, respectively). The live links can be configured to supply the address/location, phone number, or web address to the relevant software application to trigger immediate action (e.g., immediate/automatic searching of the address/location within the map software application, immediate/automatic entering of the phone number into the phone capability/software application for automatic dialing or teeing up of a call, or immediate/automatic entering of the web address into the web browser for automatic navigation via the web browser to the web address).

Figure 7P:
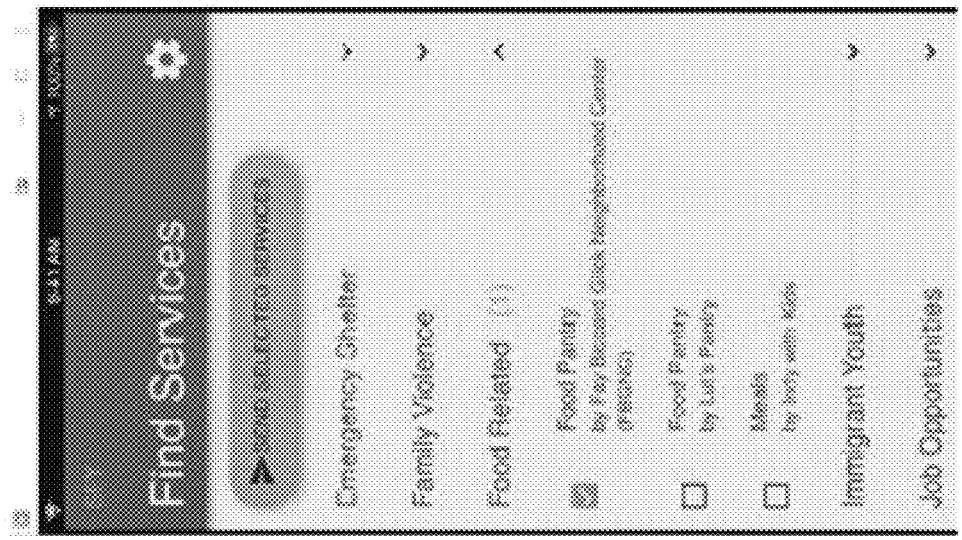
Figure 7O:
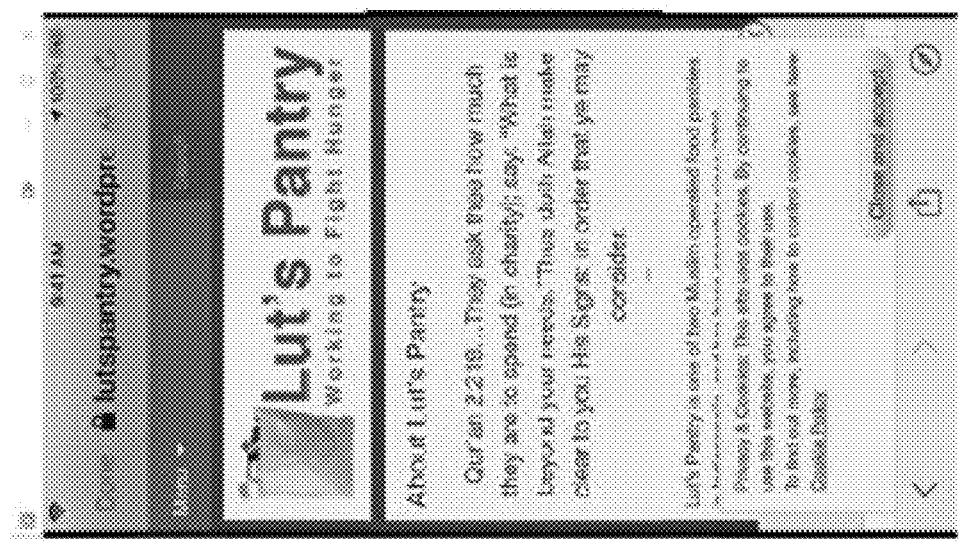
Figure 7R:
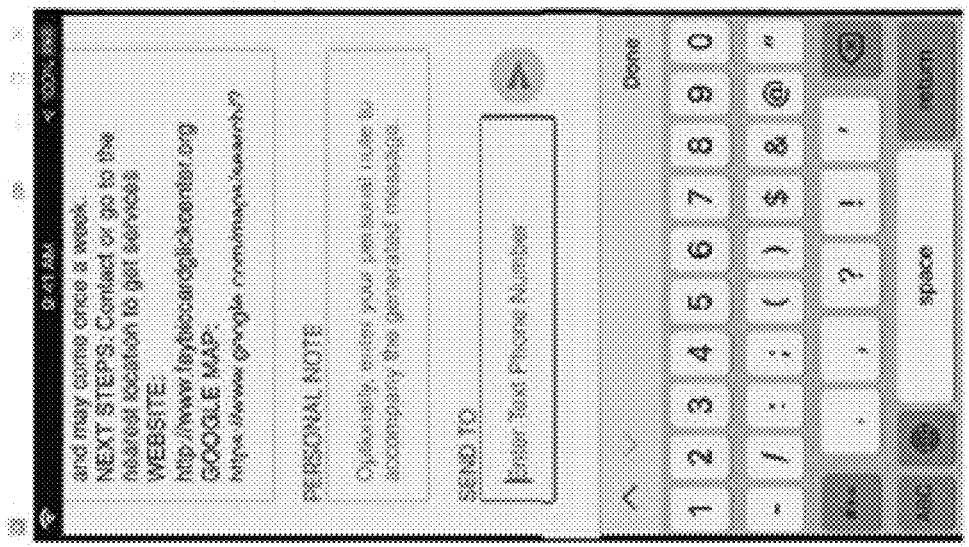
Figure 7Q:
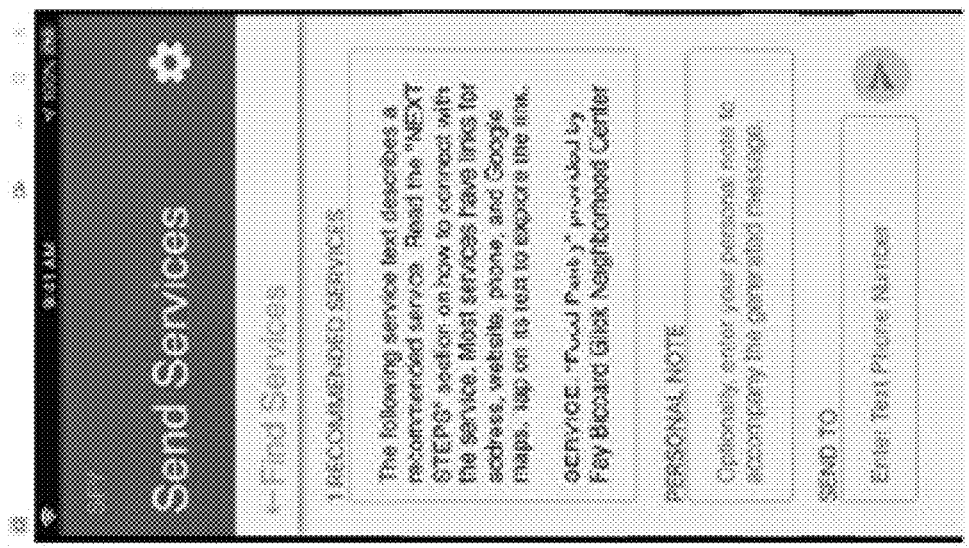
Figure 7T:
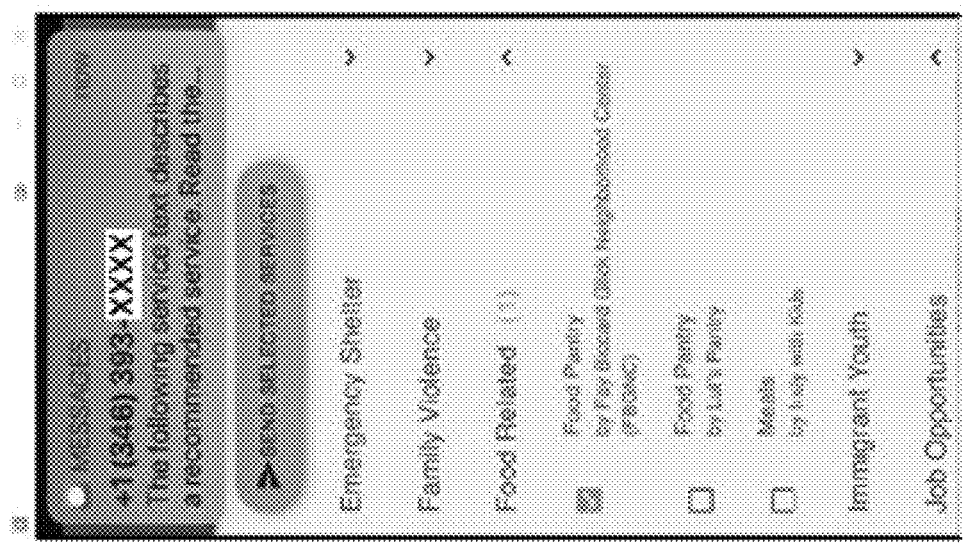
Figure 7S:
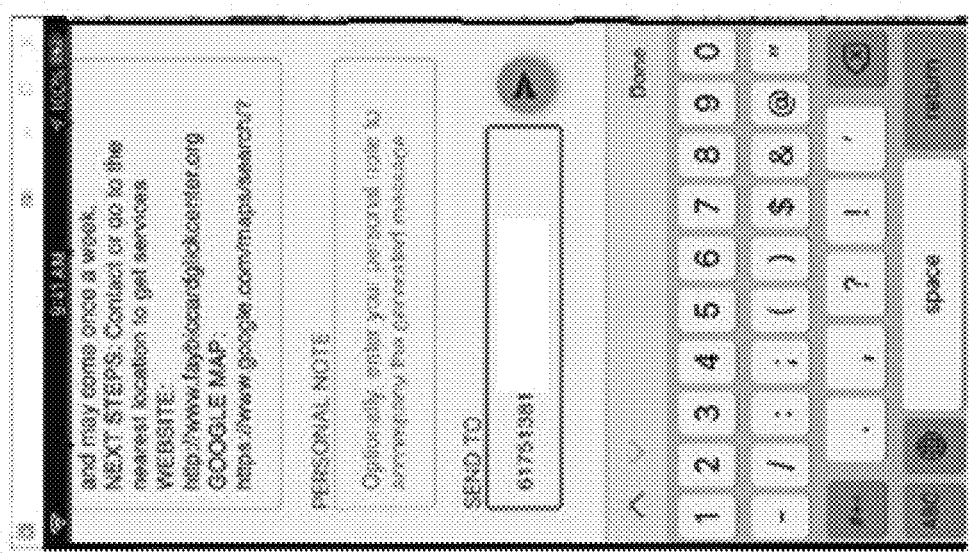
Figure 7V:
Figure 7U:
Figure 7X:
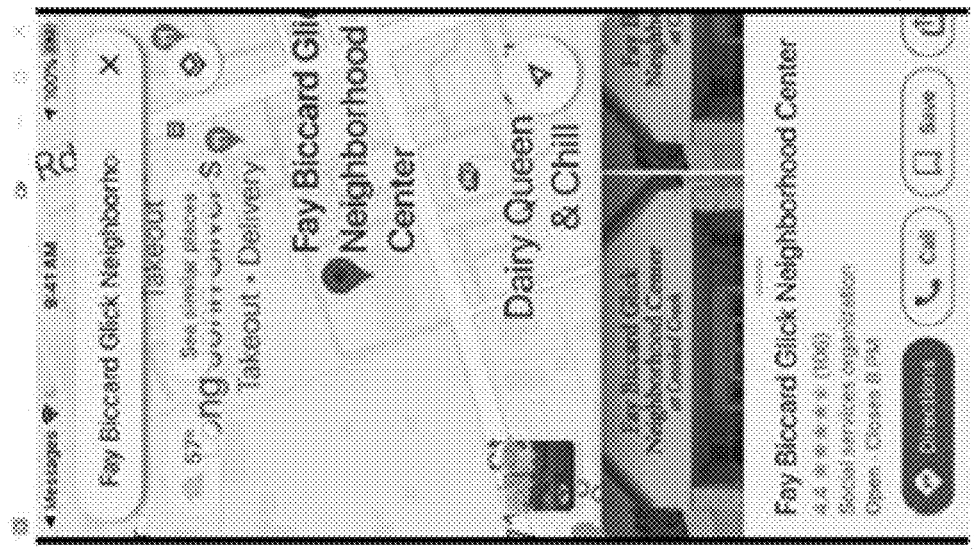
Figure 7W:
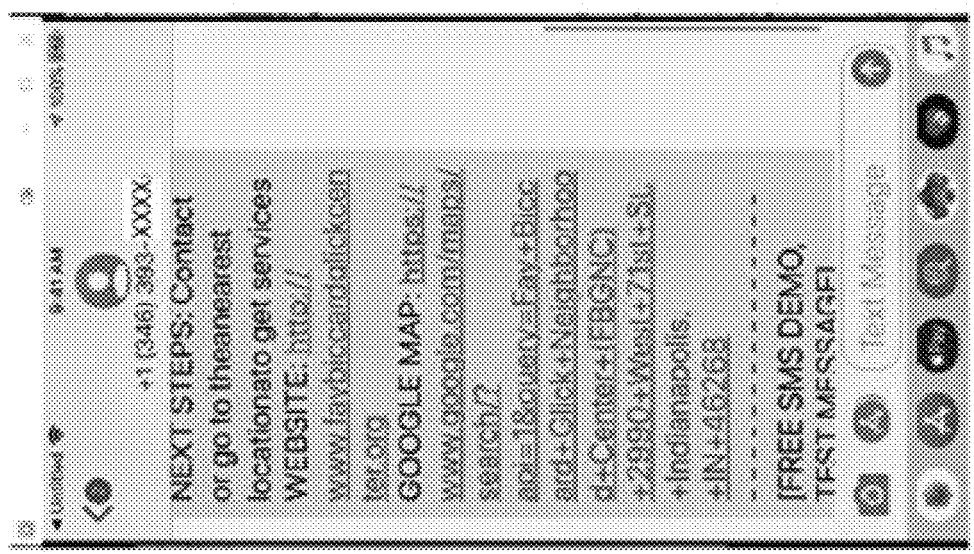

FIG. 7O shows further details about Lut's Pantry, and FIG. 7P shows a check box that can be selected to send the information about Lut's Pantry to a recipient. FIG. 7Q shows that when sending the information about a service to a recipient, the FSL application may provide an automatically generated text that describes the recommended service. Further, the user may provide a text that describes the recommended service. FIGS. 7Q and 7R show a phone number field to which the recommended service is going to be sent (e.g., via SMS, or via any other suitable means (e.g., via email)). FIG. 7S shows a step of entering a recipient's phone number, and FIG. 7T shows a step of sending a message indicating the recommended service to the recipient. FIGS. 7U-7X show the text that may be received by the recipient when the user sends a recommended service to the recipient. As discussed herein, although FIGS. 7Q and 7R show a phone number field, in other embodiments, instead of or in addition to a phone number field (and entering a phone number), an email address field and/or a VoIP address/destination field can be displayed (and, correspondingly, an email address and/or a VoIP address/destination may be entered and used for sending the message indicating the recommended service to the recipient. In still further embodiments, a printer identifier may be indicated, such that a representation of the recommended service to the recipient is sent to a printer associated with the printer identifier, for printing thereon.

Figure 7Z:
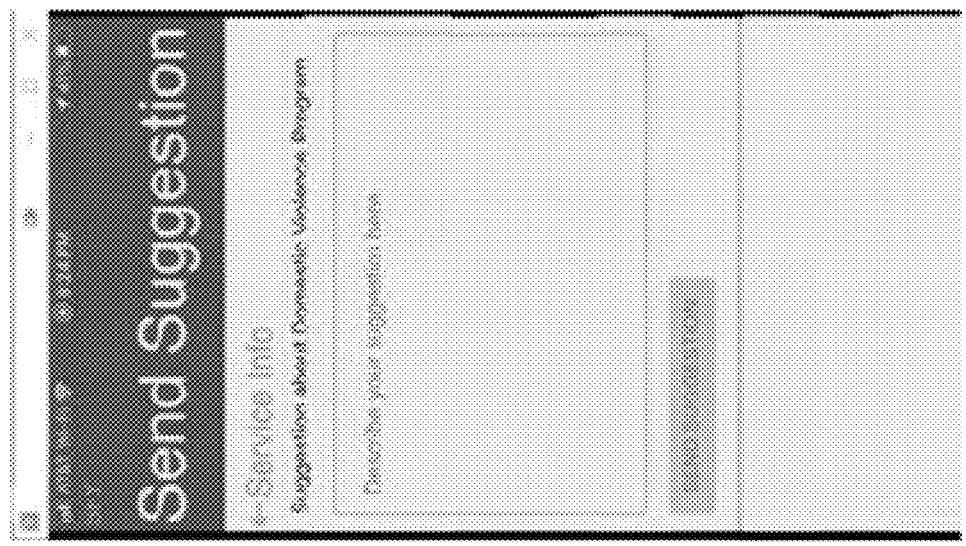
Figure 7Y:
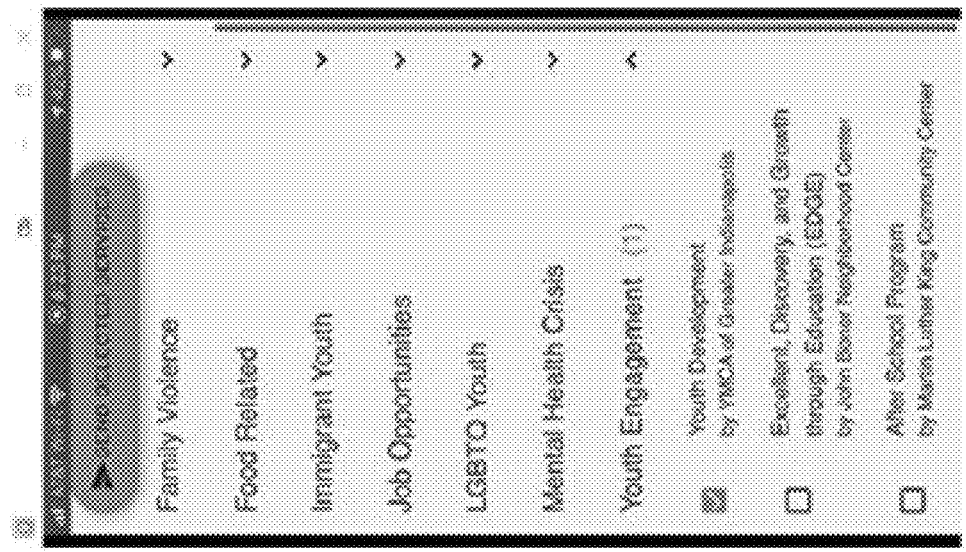
Figure 7A:
Figure 7A:
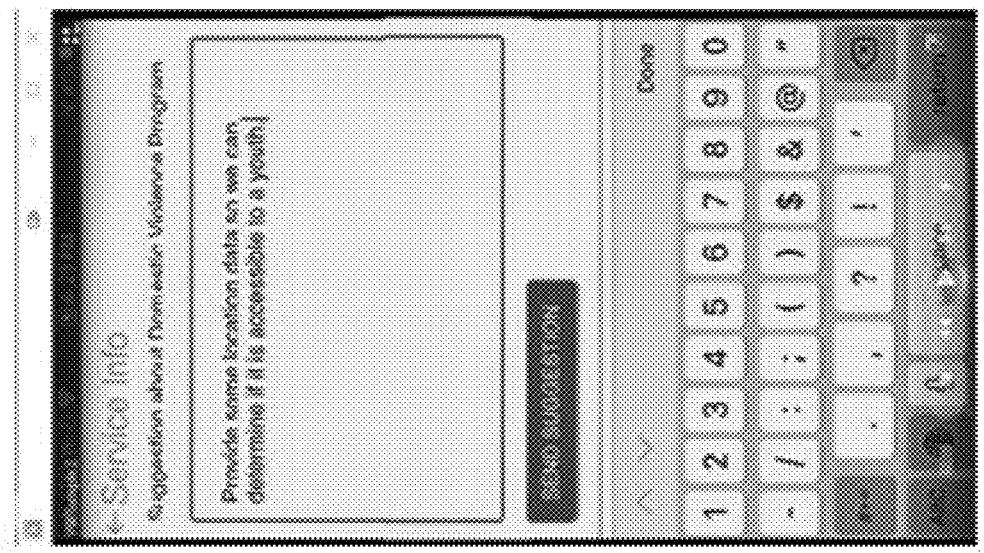
Figure 7A:
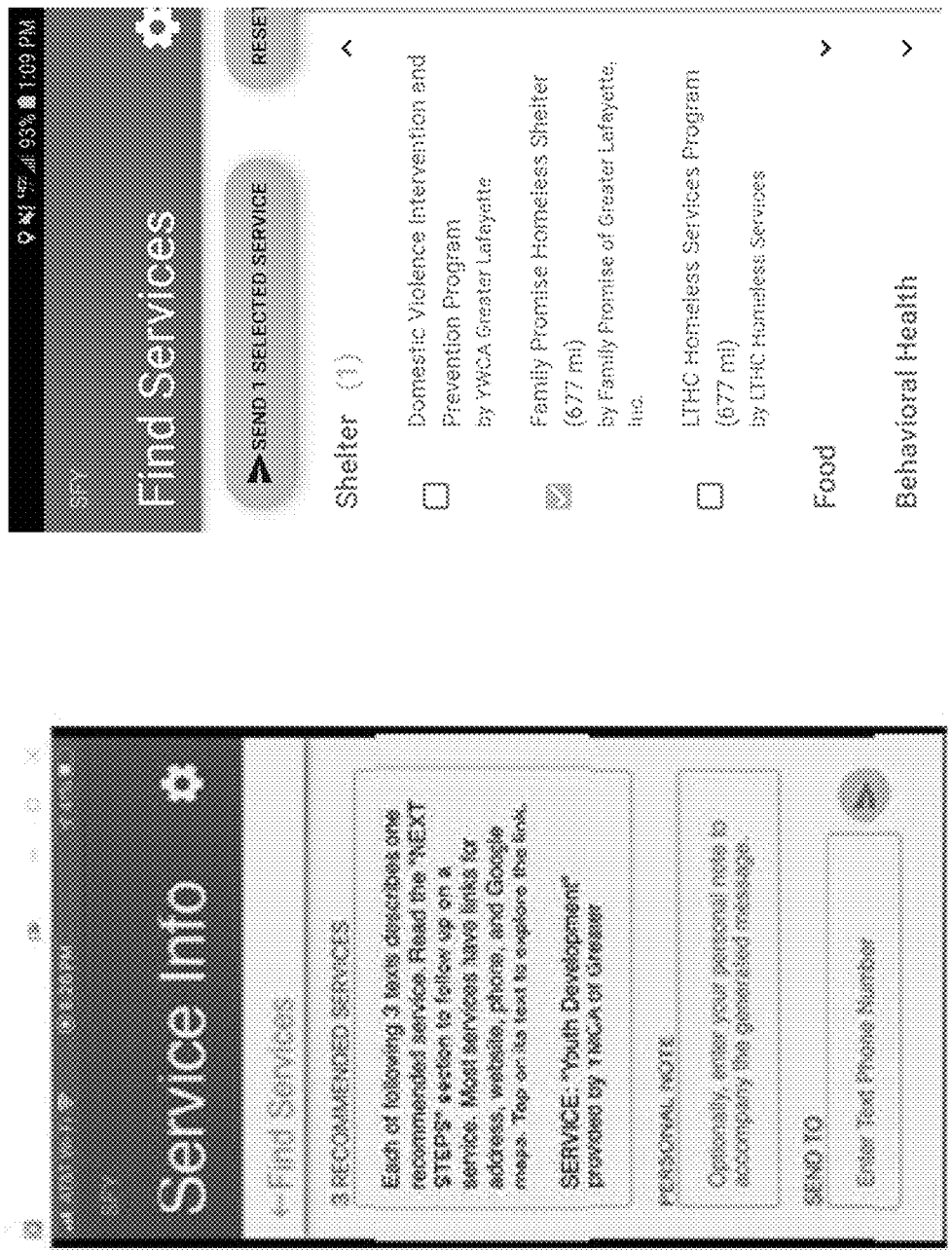
Figure 7A:
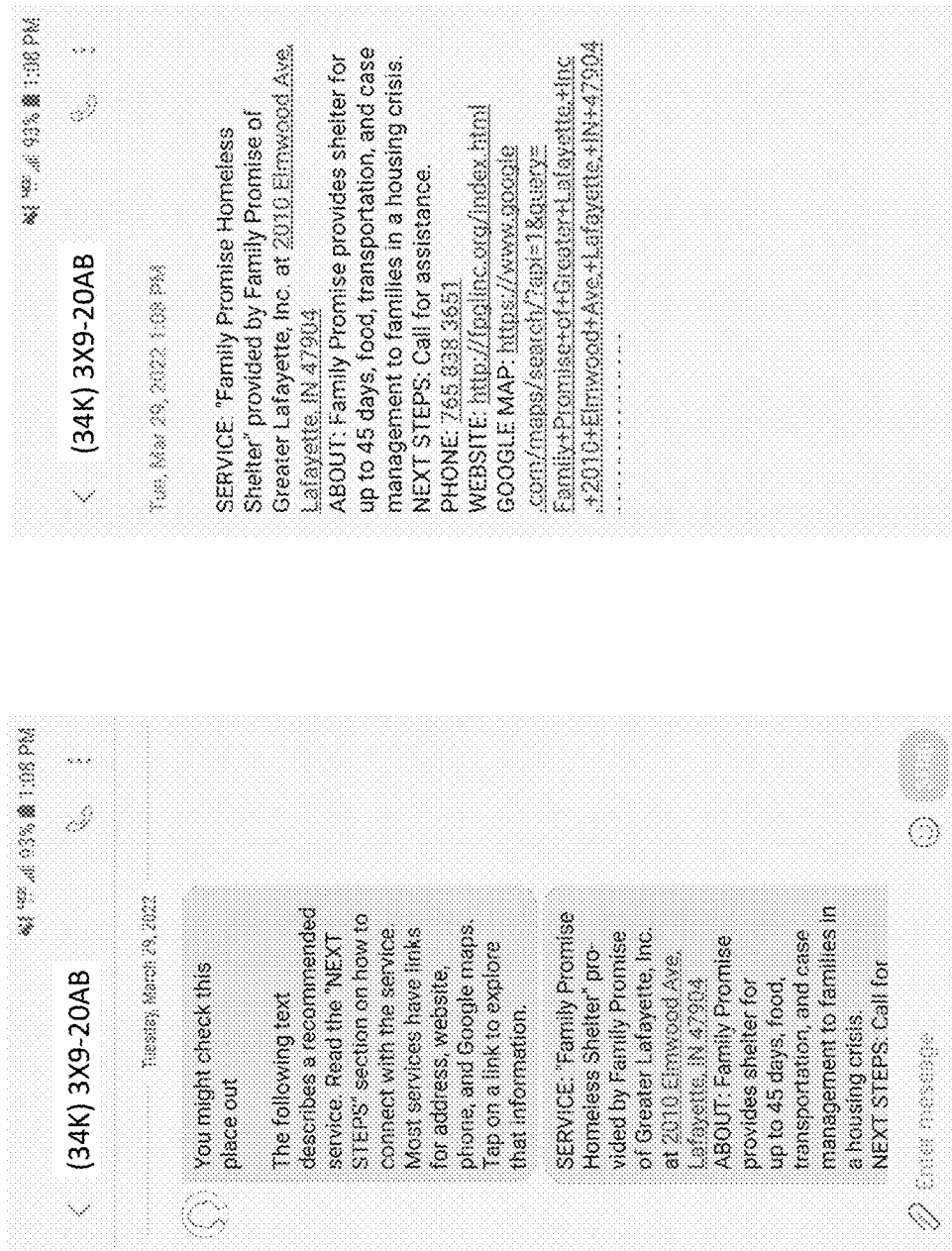

FIG. 7Y shows another view of services that can be send to a recipient and FIGS. 7Z-7AA shows suggestions about domestic violence program that can be transmitted by the FSL application to administrative services of the FSL application to provide further information about the domestic violence program. FIGS. 7AB and 7AC further show a service (Youth Development) that is selected to be transmitted to a recipient with information about the service as shown in FIG. 7AC. FIG. 7AD shows a further example view of a "pull-down" or "drop-down" list for shelter related services in the proximity of the user, with the service "Family Promise Homeless Shelter" selected and showing the "SEND 1 SELECTED SERVICE" button. FIGS. 7AE-7AF show the text message received by a recipient in response to the user selecting the "SEND 1 SELECTED SERVICE" button. Note that the displayed phone number is an alias phone number and not the phone number of the sending user.

Consistent with various embodiments of the present disclosure, a method for communication information using an application (e.g., an FSL application) from one mobile compute device to another mobile compute device is provided. The method includes receiving, at a processor of a first mobile compute device, a user input including a representation of a service request, the user input and the first mobile compute device associated with a user. Further, the method includes retrieving, via the processor and in response to receiving the user input, curated service information associated with the service request. The curated service information may be for example the same as distilled output data 654 or distilled data 313B. The method may further include displaying, via a graphical user interface (GUI) of the first mobile compute device, of the curated service information. Additionally, the method includes receiving, at the processor and in response to an interaction of the user via the GUI, a selection of a subset of service information from the curated service information. For example, such subset of service information may include information of a particular service (e.g., the information about a food service, and the like). Further, the method may include receiving, at the processor and in response to the user populating a phone number field of the GUI, a phone number; in response to at least one of the receiving the selection of the subset of service information or the receiving the phone number, causing display, via the GUI, of a send icon. Also, the step of the method includes, in response to a user selection, via the GUI, of the send icon, causing transmission of a communication to a second mobile compute device having the phone number and associated with a service recipient, the communication including a representation of the subset of service information and not including any self-identifying information associated with the user.

In some cases, retrieving the curated service information is based on at least one of: a further user input including a representation of a service category, or a location of the user. In some embodiments, the curated service information includes a location of a provider of a service associated with the service request, and a distance from the location of the user to the location of the provider of the service. In some cases, directions may be accessed by an FSL user or a recipient tapping on (or otherwise selecting) a live linked address field appearing on a service information page or in a text/email communication, respectively. In response to selecting the live linked address field, the FSL app can cause navigation, within the GUI, to a maps application on the mobile compute device of the FSL user/recipient, and the maps application can optionally determine alternate means of transportation to the service location as well as alternative routes. In other cases, a set of directions from the location of the user to the location of the service provided may be included as part of the curated service information.

In some cases, the communication between the first mobile compute device and the second mobile compute device includes a Short Message Service (SMS) text message. Alternatively, or additionally, any other suitable communication may be used (e.g., email, and the like). In some implementations, the automatic generation of a SMS text message, email, etc. increases the efficiency and speed of communications between FSL users and recipients, as contrasted with manual generation of text messages and their population prior to sending. Alternatively or in addition, by using an alias phone number when sending the communications, FSL user identity is protected.

In various embodiments, the FSL application may be configured such that the curated service information is retrieved via a website without accessing an app store.

Further, the subset of service information communicated to the second mobile compute device may be a service record from a plurality of service records (a service record may include information about a particular service).

In some cases, the method includes tracking, by transmitting data via the processor to a remote server, at least one of: a number of service requests processed, a frequency of receipt of the service requests, or a frequency at which each service record from the plurality of service records is selected. Additionally, or alternatively, the tracking may be facilitated by storing data in a memory of the first mobile device, the data associated with the at least one of: a number of service requests processed, a frequency of receipt of the service requests, or a frequency at which each service record from the plurality of service records is selected.

In some cases, the interaction of the user via the GUI is a first interaction of the user via the GUI. Additionally, the method includes receiving, at the processor and in response to a second interaction of the user via the GUI, user feedback including a representation of at least one of: a user note, a service information update recommendation, an error report (or "bug report"), or a new feature request, and automatically causing transmission of a signal representing the user feedback to a remote server. A "user note" can refer to a text note or a voice note entered by a FSL user via the FSL app, and can include comments about a particular service, a particular communication of a service to a recipient, a particular recipient associated with a communication of a service, a particular encounter with a recipient that is contemporaneous with communicating a service to the recipient (e.g., a description of the circumstances in which the recipient was encountered by the FSL user), etc. A text note can be entered via a touchscreen, and a voice note can be entered, for example, via dictation into a microphone of the FSL user's mobile device. In some embodiments, a user note can be generated in response to a FSL user's selection of a user-selectable option displayed via the GUI of the FSL app (e.g., "Document last sent") referencing a communication of a service most recently sent to a recipient), and can include generating a copy of the communication and permit the FSL to annotate the communication and send the annotated communication to the agency server/data server.

The method may also include at least one of filtering, reformatting, or reorganizing the curated service information prior to causing display of the curated service information. The curated service information may be retrieved from a remote server, and the curated service information is at least one of filtered, reformatted, or reorganized relative to a raw dataset from which the curated service information is derived.

The subset of service information may also include at least one of an address of a provider of a service associated with the service request, a description of the service provided by the provider, or an eligibility description for the service.

Consistent with some embodiments of the present disclosure the method includes receiving, from a first mobile compute device associated with a user, a signal representing a service request, retrieving, in response to receiving the service request and via a website, service information for a plurality of providers associated with the service request, the retrieving performed without accessing an app store; causing display, via a graphical user interface (GUI) of the first mobile compute device, of user-navigable representations of the service information; receiving, from the first mobile compute device, a signal representing (1) a selection of a provider from the plurality of providers, and (2) an indication of a command to send a text message containing the service information associated with the selected provider to a service recipient. Further, in response to receiving the selection of the provider and the command to send the text message, the method includes causing generation of the text message. Further the method includes at least one of: causing transmission of the text message to a second mobile compute device associated with the service recipient without transmitting self-identifying information associated with the user, or in response to detecting a lack of connectivity to the communications network, causing storage, in a memory of the first mobile compute device, of the text message for subsequent transmission.

The method also may include delaying an automatic update of the service information in response to detecting that the user is concurrently navigating the service information. The service information is configured to be retrieved from at least one remote server via an application programming interface (API).

The method further includes the user-navigable representations of the service information displayed in an arrangement having a predefined ordering associated with an affiliation of the user. In some embodiments, the method further includes receiving, from the first mobile compute device, a signal representing a reset command; and in response to receiving the signal representing the reset command, at least one of: causing a refresh of an appearance of the GUI, updating the service information, or uploading cached data from the first mobile compute device.

In some cases, the method includes causing the transmission of the text message, the text message being transmitted from an alias phone number. In various embodiments, the service information includes at least one of: an eligibility for a service, a type of the service, a location of the service, or a cost of the service.

In some cases, method includes updating the service information at a predefined frequency. As also described above, the method includes at least one of filtering, reformatting, or reorganizing the service information prior to causing display of the user-navigable representations of the service information.

FIG. 8 is a flow diagram showing a first example method of operation of a mobile app (e.g., similar to FSL application 130 in FIG. 1, FSL application 330 in FIG. 3A, or FSL mobile app 330, and/or implemented via a server such as the FSL app server 402 of FIG. 4A), in accordance with some embodiments. As shown in FIG. 8, the method 800 includes receiving, at 802, at a processor of a first mobile compute device, a user input including a representation of a service request. Each of the user input and the first mobile compute device is associated with a user. The method 800 also includes retrieving, at 804, via the processor and in response to receiving the user input, curated service information associated with the service request, and causing display, at 806, via a graphical user interface (GUI) of the first mobile compute device, of the curated service information. The method 800 also includes receiving, at 808, at the processor and in response to an interaction of the user via the GUI, a selection of a subset of service information from the curated service information, and receiving, at 810, at the processor and in response to the user populating a contact field (e.g., a phone number field, a voice over Internet Protocol (VoIP) address/destination, an email address, etc.) of the GUI, contact information (e.g., the phone number, the VoIP address, the email address, etc.). The method 800 also includes causing display, at 812, via the GUI, of a send icon in response to at least one of the receiving the selection of the subset of service information or the receiving the contact information. The method 800 also includes, at 814, causing transmission of a communication (e.g., an electronic communication) to a second mobile compute device associated with the contact information (e.g., having the phone number) and associated with a service recipient, the communication including a representation of the subset of service information and does not include any self-identifying information associated with the user.

In some implementations, the retrieving the curated service information is based on at least one of: a further user input including a representation of a service category, or a location of the user. The curated service information can include, for example, a location of a provider of a service associated with the service request, and a distance from the location of the user to the location of the provider of the service.

In some implementations, the communication is a Short Message Service (SMS) text message.

In some implementations, the curated service information is retrieved via a website without accessing an app store.

In some implementations, the subset of service information is a service record from a plurality of service records, and the method also includes tracking, by transmitting data via the processor to a remote server, at least one of: a number of service requests processed, a frequency of receipt of the service requests, or a frequency at which each service record from the plurality of service records is selected.

In some implementations, the subset of service information is a service record from a plurality of service records, and the method also includes tracking, by storing data on the data server after transmitting the data from the first mobile device to the data server, at least one of: a number of service requests processed, a frequency of receipt of the service requests, or a frequency at which each service record from the plurality of service records is selected. In some implementations, if such data cannot be sent to the data server at a particular time, the data may be stores on the first mobile device until the data can be sent to the data server for storage thereon. Alternatively or in addition, in some implementations, data associated with the FSL app usage is transmitted from the first mobile device to the data server in a "raw" format (i.e., raw data), and once received at the data server, the number of service requests processed, frequency of receipt of the service requests, and/or frequency at which each service record from the plurality of service records is selected may be extracted. The raw data can include one or more of: time/date stamp, email address of the FSL user associated with the raw data, phone number to which service information has been texted/emailed (optionally with partial obfuscation), and details about one or more "events of interest." Events of interest can include any of the following, by way of non-limiting example: an FSL user navigating multiple nested levels of the user-navigable GUIs, the FSL user making one or more selections within the FSL app (e.g., opening/expanding a service category, scrolling details about a particular service, etc.), and the FSL user sending a text/email communication to a recipient. In some implementations, the raw data can include location data. In other implementations, the FSL app may be configured to block the transmission of location data.

In some implementations, the interaction of the user via the GUI is a first interaction of the user via the GUI, and the method also includes receiving, at the processor and in response to a second interaction of the user via the GUI, user feedback. The user feedback includes a representation of at least one of: a user note, a service information update recommendation, an error report, or a new feature request. The method can also include automatically causing transmission of a signal representing the user feedback to a remote server.

In some implementations, the method 800 also includes at least one of filtering, reformatting, or reorganizing the curated service information prior to causing display of the curated service information.

In some implementations, the retrieving the curated service information is from a remote server, and the curated service information is at least one of filtered, reformatted, or reorganized relative to a raw dataset from which the curated service information is derived.

In some implementations, the subset of service information includes at least one of an address of a provider of a service associated with the service request, a description of the service provided by the provider, or an eligibility description for the service.

FIG. 9 is a flow diagram showing a second example operation of a mobile app (e.g., similar to FSL application 130 in FIG. 1, FSL application 330 in FIG. 3A, or FSL mobile app 330, and/or implemented via a server such as the FSL app server 402 of FIG. 4A), in accordance with some embodiments. As shown in FIG. 9, the method 900 includes receiving, at 902, from a first mobile compute device, a signal representing a service request. The first mobile compute device is associated with a user. The method 900 further includes retrieving, at 904, in response to receiving the service request and via a website, service information for a plurality of providers associated with the service request, the retrieving performed without accessing an app store. The method 900 further includes causing display, at 906, via a graphical user interface (GUI) of the first mobile compute device, of user-navigable representations of the service information. The method 900 also includes receiving, at 908, from the first mobile compute device, a signal representing (1) a selection of a provider from the plurality of providers, and (2) an indication of a command to send a text message containing the service information associated with the selected provider to a service recipient. The method 900 also includes causing generation of the text message at 910 in response to receiving the selection of the provider and the command to send the text message. The method 900 also includes at 912, at least one of: (a) causing transmission of the text message to a second mobile compute device associated with the service recipient without transmitting self-identifying information associated with the user, or (b) in response to detecting a lack of connectivity to the communications network, causing storage, in a memory of the first mobile compute device, of the text message for subsequent transmission.

In some implementations, the method 900 also includes delaying an automatic update of the service information in response to detecting that the user is concurrently navigating the service information.

In some implementations, the service information is retrieved from at least one remote server via an application programming interface (API).

In some implementations, the user-navigable representations of the service information are displayed in an arrangement having a predefined ordering associated with an affiliation of the user.

In some implementations, the method 900 also includes receiving, from the first mobile compute device, a signal representing a reset command. The method can also include, in response to receiving the signal representing the reset command, at least one of: causing a refresh of an appearance of the GUI, updating the service information, or uploading cached data from the first mobile compute device.

In some implementations, the method 900 includes causing the transmission of the text message, wherein the text message is transmitted from an alias phone number.

In some implementations, the service information includes at least one of: an eligibility for a service, a type of the service, a location of the service, or a cost of the service.

In some implementations, the method 900 also includes updating the service information at a predefined frequency.

In some implementations, the method 900 also includes comprising at least one of filtering, reformatting, or reorganizing the service information prior to causing display of the user-navigable representations of the service information. Any of the foregoing processes, whether performed individually or in combination, can be referred to as "distillation."

GLOSSARY

Category: FSL groups the services it displays into categories as specified by each SRSO. For example, one category might be "emergency shelters", another might be "counseling."

CBO: Community based organization. A social service organization that serves the local community.

LEA: Law enforcement agency. This includes police departments, sheriffs departments, and probation departments.

Server: Hardware configured to expose one or more web services on the internet.

Youth: Individuals of ages from 10 to 19 that might interact with SRSOs such as LEAs.

SRSO: Service recipient support organization (such as an LEA)

STSR: Services targeted for service recipients. This can include, for example, youth serving community-based organizations (i.e., CBOs that serve youths).

FSL: Fast Services Link—a software application that can provide access to currently active STSRs in a SRSO's jurisdiction or region. In some embodiments, there are four steps involved in registering a user with the FSL app (thereby rendering the user an "FSL user"): 1) FSL is delivered to a mobile device such as a cell phone by the FSL app server; 2) Entitlements to use FSL for a SRSO and its employees (or other associates) are managed via the FSL administration app; 3) Runtime data is delivered to the FSL mobile app from the FSL data server; and 4) STSR data is delivered (directly or indirectly) to the FSL mobile app from one or more databases of services via requests, for example made to one or more APIs of the one or more databases.

Web Service: A software module that is accessible via the internet using a URL. A web service may be as complex as a group of websites, or an API service, or as simple as URL that returns only a single piece of data such as the current time.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, JavaScript, NodeJS, React, Express, and/or other object-oriented, procedural, or other programming language and development tools, including those suitable for web services and web based apps. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   receiving, at a processor of a first mobile compute device, a first user input entered by a user, the first user input indicating an agency affiliation of the user;
   receiving, at the processor, agency configuration data from a server based on the first user input;

receiving, at the processor, a second user input entered by the user and including a representation of a service request selected from a plurality of service requests, the plurality of service requests being generated based on the agency configuration data, the service request being associated with at least one of a shelter service, a food service, a health service, a counselling service, or a service provided by a youth-serving community-based organization;
retrieving, via the processor and in response to receiving the second user input, curated service information associated with the service request;
causing display, via a graphical user interface (GUI) of the first mobile compute device, of the curated service information;
receiving, at the processor and in response to an interaction of the user via the GUI, a selection of a subset of service information from the curated service information;
receiving, at the processor and in response to the user populating a phone number field of the GUI, a phone number;
in response to the receiving the selection of the subset of service information and the receiving the phone number, causing display, via the GUI, of a send icon; and
in response to a user selection, via the GUI, of the send icon, causing transmission of a communication to a second mobile compute device having the phone number and associated with a service recipient, the communication including a representation of the subset of service information and not including any self-identifying information associated with the user.

2. The method of claim 1, wherein the retrieving the curated service information is based on at least one of: a further user input including a representation of a service category, or a location of the user.

3. The method of claim 2, wherein the curated service information includes a location of a provider of a service associated with the service request, and a distance from the location of the user to the location of the provider of the service.

4. The method of claim 1, wherein the communication is one of a Short Message Service (SMS) text message or an email.

5. The method of claim 1, wherein the curated service information is retrieved via a website without accessing an app store.

6. The method of claim 1, wherein the subset of service information is a service record from a plurality of service records, the method further comprising transmitting data via the processor to a remote server for tracking of service requests.

7. The method of claim 1, wherein the subset of service information is a service record from a plurality of service records, the method further comprising storing data in a memory of the first mobile device, for tracking of service requests.

8. The method of claim 1, wherein the interaction of the user via the GUI is a first interaction of the user via the GUI, the method further comprising:
receiving, at the processor and in response to a second interaction of the user via the GUI, user feedback including a representation of at least one of: a user note, a service information update recommendation, an error report, or a new feature request; and
automatically causing transmission of a signal representing the user feedback to a remote server.

9. The method of claim 1, further comprising at least one of filtering, reformatting, or reorganizing the curated service information prior to causing display of the curated service information.

10. The method of claim 1, wherein the retrieving the curated service information is from a remote server, and the curated service information is at least one of filtered, reformatted, or reorganized relative to a raw dataset from which the curated service information is derived.

11. The method of claim 1, wherein the subset of service information includes at least one of an address of a provider of a service associated with the service request, a description of the service provided by the provider, or an eligibility description for the service.

12. A method comprising:
receiving, at a processor and from a first mobile compute device, a signal representing an agency affiliation of a user;
retrieving, at the processor, agency configuration data from a server based on the signal representing the agency affiliation of the user;
receiving, at the processor and from the first mobile compute device, a signal representing a service request from a plurality of service requests, the plurality of service requests being generated based on the agency configuration data, and the service request being associated with at least one of a shelter service, a food service, a health service, a counselling service, or a service provided by a youth-serving community-based organization;
retrieving, via the processor, in response to receiving the service request, service information for a plurality of providers associated with the service request, the retrieving performed without accessing an app store;
causing display, via a graphical user interface (GUI) of the first mobile compute device, of user-navigable representations of the service information;
receiving, at the processor and from the first mobile compute device, a signal representing (1) a selection of a provider from the plurality of providers, and (2) an indication of a command to send one of a text message or an email containing the service information associated with the selected provider to a service recipient;
in response to receiving the selection of the provider and the command to send the one of the text message or the email, causing generation of the one of the text message or the email; and
at least one of:
in response to detecting connectivity to a communications network, causing transmission, via the processor, of the one of the text message or the email to a second mobile compute device associated with the service recipient without transmitting self-identifying information associated with the user; or
in response to detecting a lack of connectivity to the communications network, causing storage, via the processor and in a memory of the first mobile compute device, of the one of the text message or the email for subsequent transmission.

13. The method of claim 12, further comprising delaying, via the processor, an automatic update of the service information in response to detecting that the user is concurrently navigating the service information.

14. The method of claim 12, wherein the service information is retrieved from at least one remote server via an application programming interface (API).

15. The method of claim 12, wherein the user-navigable representations of the service information are displayed in an arrangement having a predefined ordering associated with an affiliation of the user.

16. The method of claim 12, further comprising:
receiving, at the processor and from the first mobile compute device, a signal representing a reset command; and
in response to receiving the signal representing the reset command, at least one of:
causing, via the processor, a refresh of an appearance of the GUI;
updating, via the processor, the service information; or
uploading, via the processor, cached data from the first mobile compute device.

17. The method of claim 12, comprising causing, via the processor, the transmission of the text message, the text message being transmitted from an alias phone number.

18. The method of claim 12, wherein the service information includes at least one of: an eligibility for a service, a type of the service, a location of the service, or a cost of the service.

19. The method of claim 12, further comprising updating, via the processor, the service information at a predefined frequency.

20. The method of claim 12, further comprising at least one of filtering, reformatting, or reorganizing the service information, via the processor and prior to causing display of the user-navigable representations of the service information.

* * * * *